(12) United States Patent
Someda et al.

(10) Patent No.: US 11,385,203 B2
(45) Date of Patent: Jul. 12, 2022

(54) DETECTION DEVICE, DETECTION SYSTEM, DETECTION METHOD, AND INFORMATION PROCESSING DEVICE

(71) Applicant: KABUSHIKI KAISHA TOSHIBA, Tokyo (JP)

(72) Inventors: Keiichiro Someda, Kawasaki Kanagawa (JP); Takashi Usui, Saitama Saitama (JP); Kazuo Watabe, Yokohama Kanagawa (JP); Shuichi Hirano, Tokyo (JP)

(73) Assignee: KABUSHIKI KAISHA TOSHIBA, Tokyo (JP)

( * ) Notice: Subject to any disclaimer, the term of this patent is extended or adjusted under 35 U.S.C. 154(b) by 201 days.

(21) Appl. No.: 16/737,004

(22) Filed: Jan. 8, 2020

(65) Prior Publication Data

US 2020/0217822 A1    Jul. 9, 2020

(30) Foreign Application Priority Data

Jan. 9, 2019  (JP) .............................. JP2019-002211

(51) Int. Cl.
*G01N 29/24*  (2006.01)
*G01N 29/44*  (2006.01)
(Continued)

(52) U.S. Cl.
CPC ........... *G01N 29/14* (2013.01); *G01N 29/223* (2013.01); *G01N 29/2437* (2013.01);
(Continued)

(58) Field of Classification Search
CPC .. G01N 29/2481; G01N 29/14; G01N 29/223; G01N 29/2437; G01N 29/44;
(Continued)

(56) References Cited

U.S. PATENT DOCUMENTS 4,535,629 A  8/1985 Prine
8,803,977 B2*  8/2014 Uchima ................. E01D 22/00
                                                          348/164

(Continued)

FOREIGN PATENT DOCUMENTS

JP    S61-284657 A    12/1986
JP    S62-43565 A    2/1987
(Continued)

OTHER PUBLICATIONS

Mori, "Fatigue of Steel Deck, Past and Future," Katayama Technical Report, No. 31, pp. 2-10 (2012).

*Primary Examiner* — Jacques M Saint Surin
(74) *Attorney, Agent, or Firm* — Finnegan, Henderson, Farabow, Garrett & Dunner L.L.P.

(57) ABSTRACT

According to one embodiment, a detection system includes a plurality of sensors, a locator, a first counter, and a determiner. The plurality of sensors that detect an elastic wave, the sensors being disposed separately from each other in a direction in which the welded portion extends and each being installed on the first member or the second member. The locator that locates a generation source position of the elastic wave on the basis of outputs of the plurality of sensors. The first counter that accumulates information of generation source positions of a plurality of elastic waves located by the locator to calculate a distribution of generation source positions of the plurality of elastic waves over a predetermined time. The determiner that determines the position of the crack on the basis of the distribution calculated by the first counter.

19 Claims, 21 Drawing Sheets

(51) Int. Cl.
     *G01N 29/22*      (2006.01)
     *G01N 29/14*      (2006.01)

(52) U.S. Cl.
     CPC ......... *G01N 29/2481* (2013.01); *G01N 29/44* (2013.01); *G01N 2291/0289* (2013.01); *G01N 2291/267* (2013.01)

(58) Field of Classification Search
     CPC ............ G01N 29/07; G01N 2291/267; G01N 2291/011; G01N 2291/0289
     USPC .......................................................... 73/587
     See application file for complete search history.

(56) References Cited

U.S. PATENT DOCUMENTS

| | | | |
|---|---|---|---|
| 10,175,355 B2 * | 1/2019 | Fukuman | G01S 15/931 |
| 10,365,250 B2 * | 7/2019 | Usui | G01N 29/043 |
| 10,724,996 B2 * | 7/2020 | Usui | G01N 29/4472 |
| 11,073,498 B2 * | 7/2021 | Fumikura | G01N 29/043 |
| 2012/0120246 A1 * | 5/2012 | Uchima | G01J 5/0022 |
| | | | 348/164 |
| 2017/0138910 A1 | 5/2017 | Usui et al. | |
| 2021/0105325 A1 * | 4/2021 | Tsuyunashi | H04L 67/18 |

FOREIGN PATENT DOCUMENTS

| | | | | |
|---|---|---|---|---|
| JP | 20082092 | * | 9/2008 | ............ G01N 29/26 |
| JP | 2010-54497 A | | 3/2010 | |
| JP | 2014-80133 A | | 5/2014 | |
| JP | 2017-90311 A | | 5/2017 | |

* cited by examiner (a)            (b)

DETECTION DEVICE, DETECTION SYSTEM, DETECTION METHOD, AND INFORMATION PROCESSING DEVICE

CROSS-REFERENCE TO RELATED APPLICATION

This application is based upon and claims the benefit of priority from Japanese Patent Application No. 2019-002211, filed Jan. 9, 2019, the entire contents of which are incorporated herein by reference.

FIELD

Embodiments described herein relate generally to a detection device, a detection system, a detection method, and an information processing device.

BACKGROUND

It is known that fatigue cracks occur in a welded portion of a structure such as, for example, a bridge, in association with public use of the structure over a long period of time. However, various constraints are imposed on a method of detecting the state of such a structure, and it may be difficult to detect the state of the structure with a good degree of accuracy.

DETAILED DESCRIPTION

Figure 1:
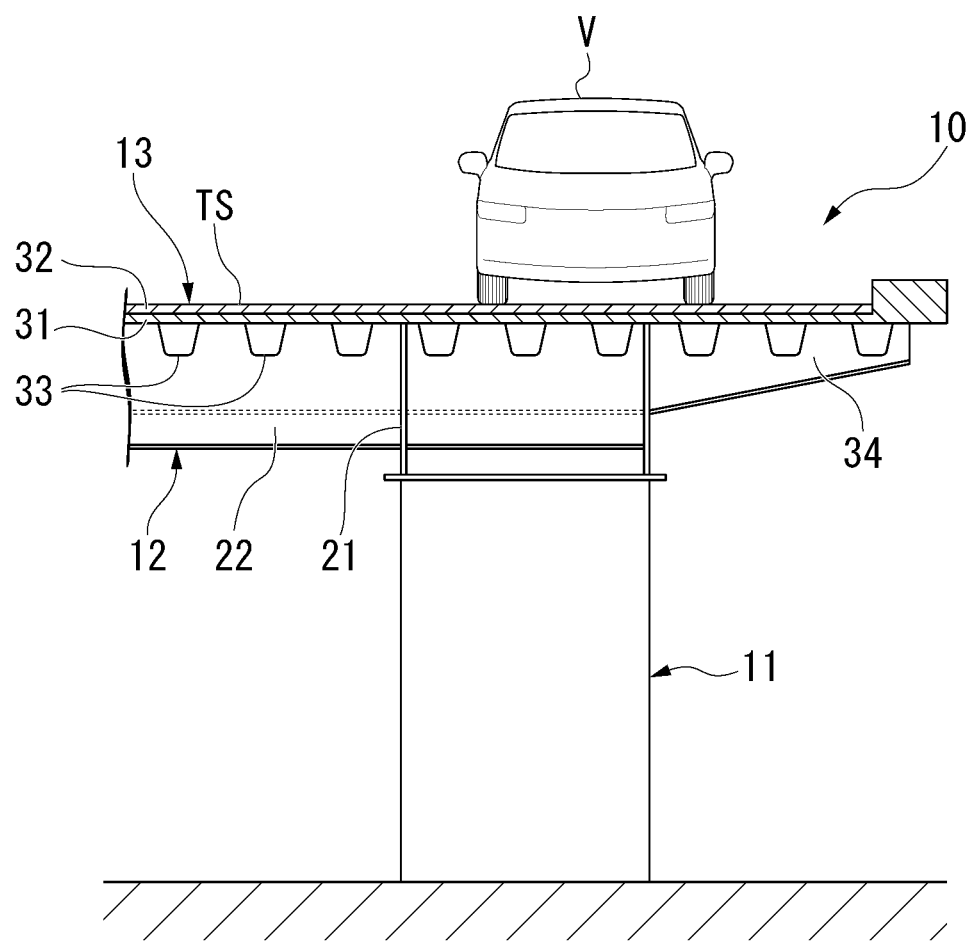
FIG. 1 is a cross-sectional view illustrating a bridge structure of a first embodiment.

Hereinafter, a detection device, a detection system, a detection method, and an information processing device of an embodiment will be described with reference to the accompanying drawings. Meanwhile, in the following description, components having the same or similar functions are denoted by the same reference numerals and signs. Description of such components will not be repeated. The wording "based on XX" referred to in this specification means "based on at least XX," and also includes cases based on other elements in addition to XX. In addition, the wording "based on XX" also includes a case based on an arithmetic operation or processing being performed on XX without being limited to a case in which XX is used directly. The term "XX" refers to any element (for example, any information).

The wording "state of a structure" referred to in the present application is used in a broad meaning inclusive of the state of deterioration, the state of a crack, or the like. That is, the wording "detecting the state of a structure" referred to in the present application means detecting at least one of the presence or absence of deterioration, the degree of the deterioration, the presence or absence of a crack, the position of the crack, the degree of the crack, and the like. Herein, first, an example of a structure to which the detection device, the detection system, the detection method, and the information processing device of the present embodiment are applied will be described.

First Embodiment

FIG. 1 is a cross-sectional view illustrating an example of a bridge structure 10.

The bridge structure 10 is an example of a "structure" to which the detection device, the detection system, the detection method, and the information processing device of the present embodiment are applied. Meanwhile, the term "bridge" referred to in the present application is not limited to a structure installed on a river, a valley or the like, and widely covers various structures (for example, elevated bridges of an expressway) and the like which are provided above the ground surface. In addition, the structure to which the detection device, the detection system, the detection method, and the information processing device of the present embodiment can be applied is not limited to a bridge, and may preferably be a structure in which an elastic wave is generated in association with the generation or progress of a crack. That is, the detection device, the detection system, the detection method, and the information processing device of the present embodiment may be applied to, for example, a structure which has nothing to do with a road.

As shown in FIG. 1, the bridge structure 10 includes a bridge pier 11, a support structure 12, and a steel plate deck 13.

The bridge pier 11 is provided on the ground surface, and stands upright in an approximately vertical direction.

The support structure 12 is provided on the bridge pier 11, and is disposed between the bridge pier 11 and the steel plate deck 13. The support structure 12 includes a plurality of main girders (longitudinal girder) 21 and a plurality of cross beams 22. The main girders 21 stand upright in an approximately vertical direction, and are provided along a bridge axial direction BD (see FIG. 2). The cross beams 22 stand upright in an approximately vertical direction, and are provided along a direction intersecting (for example, substantially orthogonal to) the bridge axial direction BD. The cross beams 22 are welded with a deck plate 31 and longitudinal ribs 33 to be described later, and have a larger plate thickness than the longitudinal ribs 33. The support structure 12 is formed by the plurality of main girders 21 and the plurality of cross beams 22 being combined with each other. The main girders 21 and the cross beams 22 are welded on the steel plate deck 13. For example, the plate thickness of the main girders 21 or the cross beams 22 is larger than the plate thickness of the longitudinal ribs 33 or a transverse rib 34. Meanwhile, the term "bridge-axial direction" refers to a direction in which the bridge structure 10 extends, and, for example, a direction along the traveling direction of a vehicle V traveling on the bridge structure 10.

The steel plate deck 13 is installed on the support structure 12, and forms a traveling surface TS on which the vehicle V travels. The steel plate deck 13 is supported by the support structure 12 from below, and is disposed at a position above the ground surface.

Figure 2:
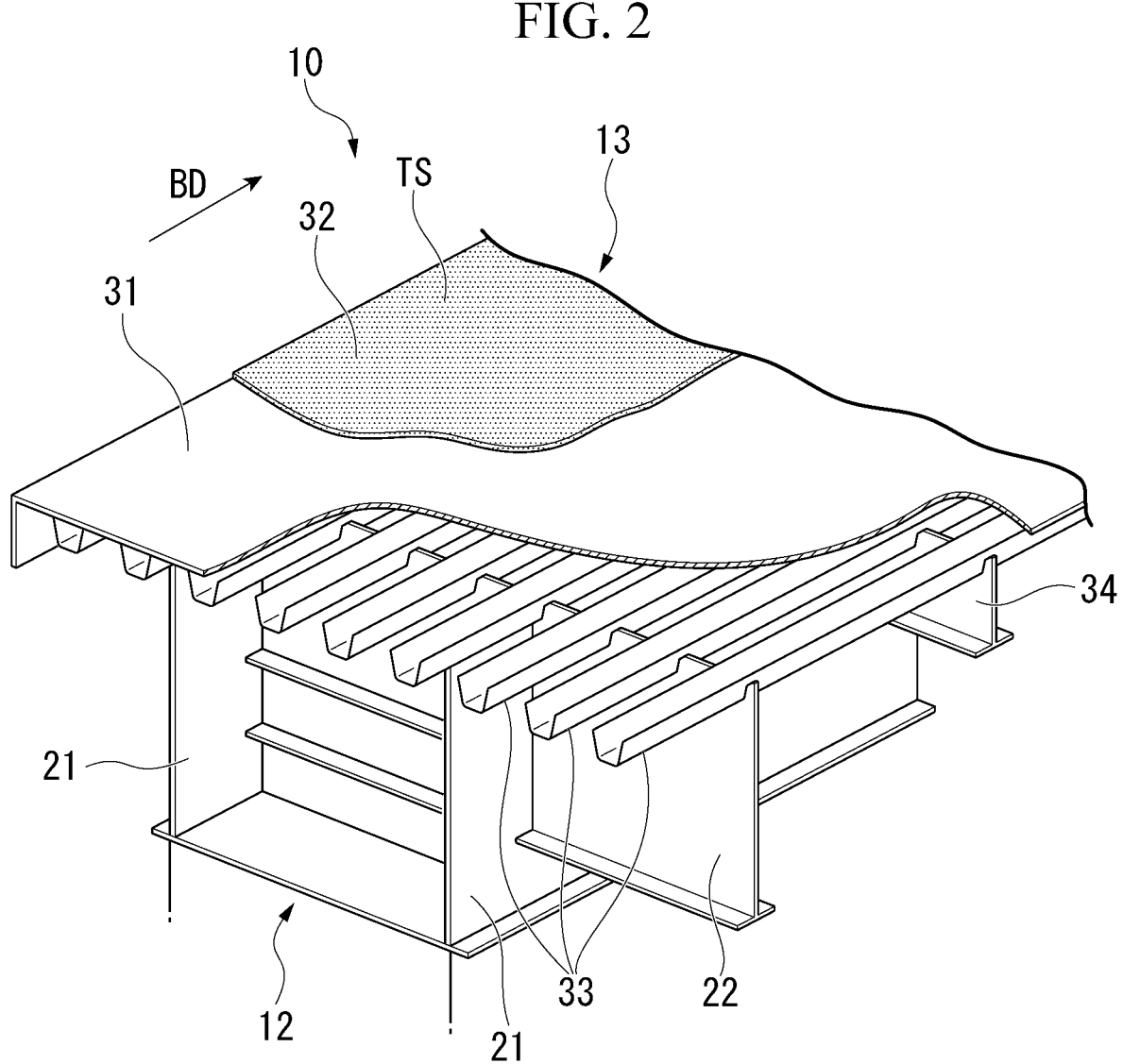
FIG. 2 is a cross-sectional perspective view illustrating a support structure and a steel plate deck of the first embodiment.

FIG. 2 is a cross-sectional perspective view illustrating the support structure 12 and the steel plate deck 13.

As shown in FIG. 2, the steel plate deck 13 includes, for example, the deck plate 31, a pavement portion 32, the longitudinal ribs (trough ribs) 33, and the transverse rib 34.

The deck plate 31 extends below the traveling surface TS on which the vehicle V travels, and supports the traveling surface TS from below. The deck plate 31 is an example of a "first member." For example, the deck plate 31 is a metallic plate member extending approximately in parallel to the traveling surface TS.

The pavement portion (pavement member) 32 is provided on the upper surface of the deck plate 31. The pavement portion 32 is formed of, for example, asphalt or the like. The upper surface of the pavement portion 32 forms the traveling surface TS on which the vehicle V travels. Meanwhile, the wording "(the first member) supports the traveling surface from below" referred to in the present application includes, for example, the meaning that the first member supports a member (for example, the pavement portion 32) having the traveling surface TS formed thereon from below.

The longitudinal ribs 33 are installed on the lower surface of the deck plate 31, and extend along the bridge axial direction BD. On the other hand, the transverse rib 34 is a plate member made of a metal along a direction intersecting (for example, substantially orthogonal to) the bridge axial direction BD, and is coupled to the deck plate 31 and the plurality of longitudinal ribs 33. The longitudinal rib 33 and the transverse rib 34 are stiffening members for stiffening the deck plate 31.

Figure 3:
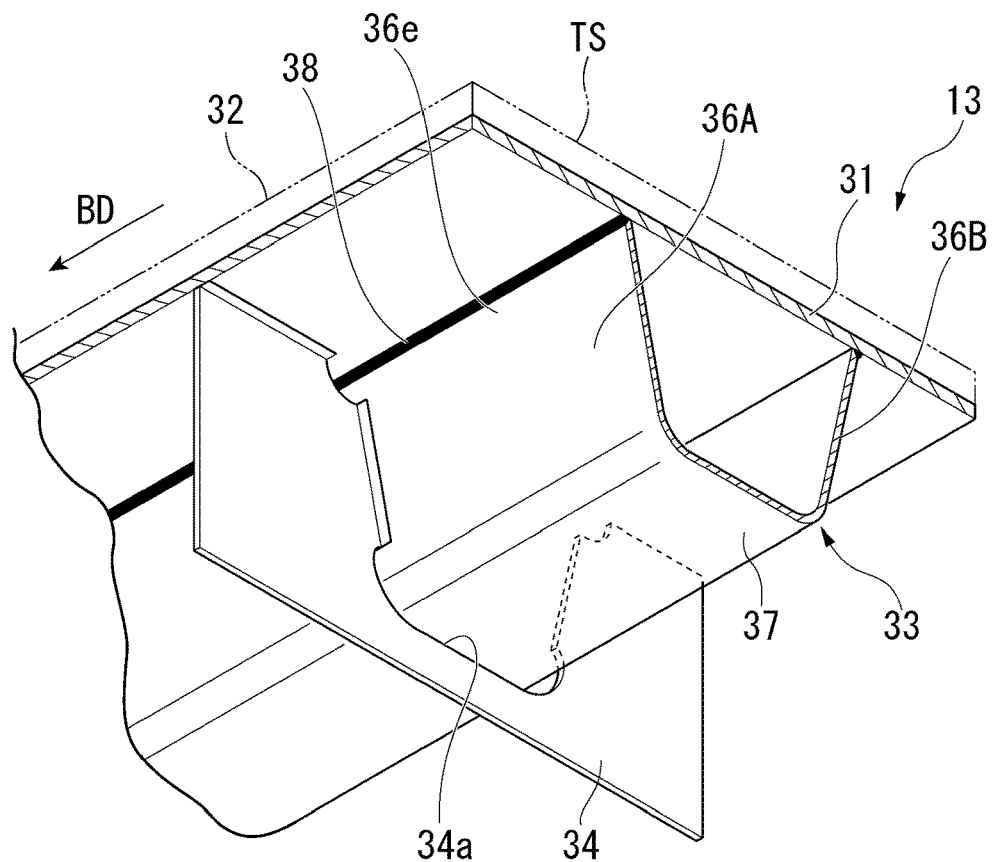
FIG. 3 is a cross-sectional perspective view of the steel plate deck of the first embodiment viewed obliquely from below.

FIG. 3 is a cross-sectional perspective view of the steel plate deck 13 viewed obliquely from below.

As shown in FIG. 3, the longitudinal ribs 33 are provided below the deck plate 31. That is, the longitudinal ribs 33 are provided on the opposite side of the traveling surface TS with respect to the deck plate 31. The longitudinal ribs 33 are an example of a "second member." For example, the longitudinal ribs 33 are ribs made of a metal having a U-shaped cross-sectional shape (U ribs).

Specifically, the longitudinal rib 33 includes upright standing portions 36A and 36B and a horizontal portion 37.

Each pair of upright standing portions 36A and 36B is a plate portion along a direction intersecting the traveling surface TS, and extends in a direction away from the traveling surface TS. For example, the pair of upright standing portions 36A and 36B are inclined with respect to each other so that an interval between the upright standing portions 36A and 36B becomes gradually smaller as the distance from the traveling surface TS increases. For example, the thickness (plate thickness) of each of the upright standing portions 36A and 36B is smaller than the thickness (plate thickness) of the deck plate 31. For this reason, in the upright standing portions 36A and 36B, there is more of a tendency for an elastic wave to be propagated than in the deck plate 31. In addition, the upright standing portions 36A and 36B are not covered with the pavement portion 32 having a tendency to absorb an elastic wave. From this viewpoint, in the upright standing portions 36A and 36B, there is more of a tendency for an elastic wave to be propagated than in the deck plate 31. The thickness (plate thickness) of each of the upright standing portions 36A and 36B is approximately constant, for example, in the bridge axial direction BD.

The horizontal portion 37 is a plate portion which is substantially parallel to the traveling surface TS. The horizontal portion 37 is provided between the lower end portions of the pair of upright standing portions 36A and 36B, and connects the lower end portions of the upright standing portions 36A and 36B. The longitudinal rib 33 is formed in a U-shape by the upright standing portions 36A and 36B and the horizontal portion 37 being connected to each other.

The transverse ribs 34 include notches 34a through which the longitudinal ribs 33 are passed. For example, the transverse ribs 34 are fixed to the lower surface of the deck plate 31 and the lateral sides of the upright standing portions 36A and 36B of the longitudinal ribs 33 by welding.

Next, a welded portion 38 provided in the steel plate deck 13 will be described.

As shown in FIG. 3, the steel plate deck 13 includes the welded portion 38 between the deck plate 31 and the longitudinal ribs 33. The welded portion 38 is provided continuously in the bridge axial direction BD along the boundary between the deck plate 31 and the longitudinal ribs 33. Specifically, each of the upright standing portions 36A and 36B of the longitudinal rib 33 includes an end portion (upper end portion) 36e facing the deck plate 31. The welded portion 38 is provided along the end portions 36e of the upright standing portions 36A and 36B of the longitudinal ribs 33. The welded portion 38 extends in the bridge axial direction BD along a direction in which the longitudinal ribs 33 extend. The welded portion 38 fixes (joins) the lower surface of the deck plate 31 to the end portion 36e of the upright standing portions 36A and 36B of the longitudinal ribs 33.

Figure 4:
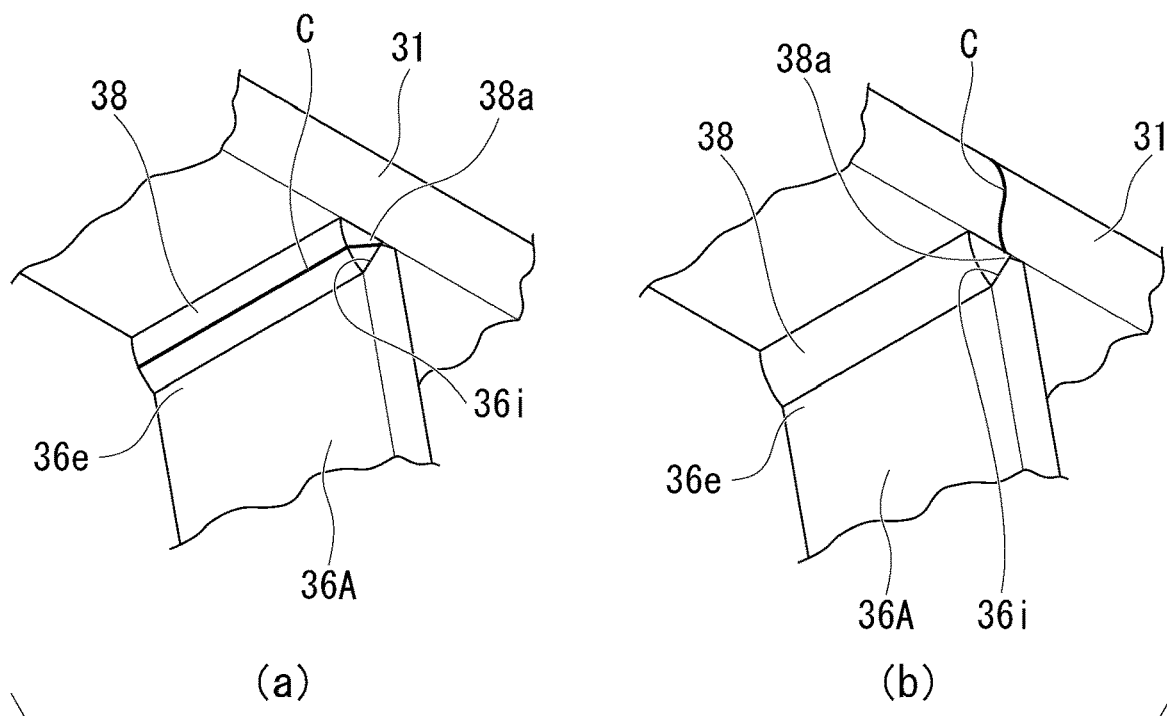
FIG. 4 is a cross-sectional perspective view illustrating a welded portion of the steel plate deck of the first embodiment and its surroundings.

FIG. 4 shows the welded portion 38 of the steel plate deck 13 and its surroundings. Meanwhile, for convenience of description, hatching of a cross-sectional portion is omitted in FIG. 4.

As shown in FIG. 4, the end portion 36e of the upright standing portions 36A and 36B of the longitudinal rib 33 includes an inclined portion (an inclined surface or a root surface) 36i. On the end portion 36e of the upright standing portions 36A and 36B, the inclined portion 36i is provided outside the pair of upright standing portions 36A and 36B. The inclined portion 36i is inclined in a direction away from the lower surface of the deck plate 31 with progress toward the outside of the pair of upright standing portions 36A and 36B. For this reason, a gap into which the welded portion 38 penetrates is formed between the lower surface of the deck plate 31 and the inclined portion 36i of the upright standing portions 36A and 36B. At least a portion of the welded portion 38 is provided between the lower surface of the deck plate 31 and the inclined portion 36i of the upright standing portions 36A and 36B.

Here, there is the possibility of a fatigue crack C (hereinafter, simply referred to as a crack C) occurring in the welded portion 38 in association with the public use of the bridge structure 10 over a long period of time. There are two general patterns in this crack C. As shown in part (a) of FIG. 4, the crack C of a first pattern is a crack (bead penetration crack) that develops from a root (root portion) 38a of the welded portion 38 toward a welding bead. In this case, the crack C that has developed is present in the welded portion 38 itself. On the other hand, as shown in part (b) of FIG. 4, the crack C of a second pattern is a crack (deck plate penetration crack) that develops from the root 38a of the welded portion 38 to the deck plate 31. In this case, the crack C that has developed is present adjacent to the welded portion 38 (that is, present in the deck plate 31 which is a member adjacent to the welded portion 38). Here, the upper surface of the deck plate 31 is covered with the pavement portion 32. For this reason, it is particularly difficult to visually confirm the crack C that develops in the deck plate 31. A detection system 1 of the present embodiment detects an elastic wave which is generated in the bridge structure 10, for example, through the generation or development of the cracks C.

Next, the detection system 1 of the present embodiment will be described.

Figure 5:
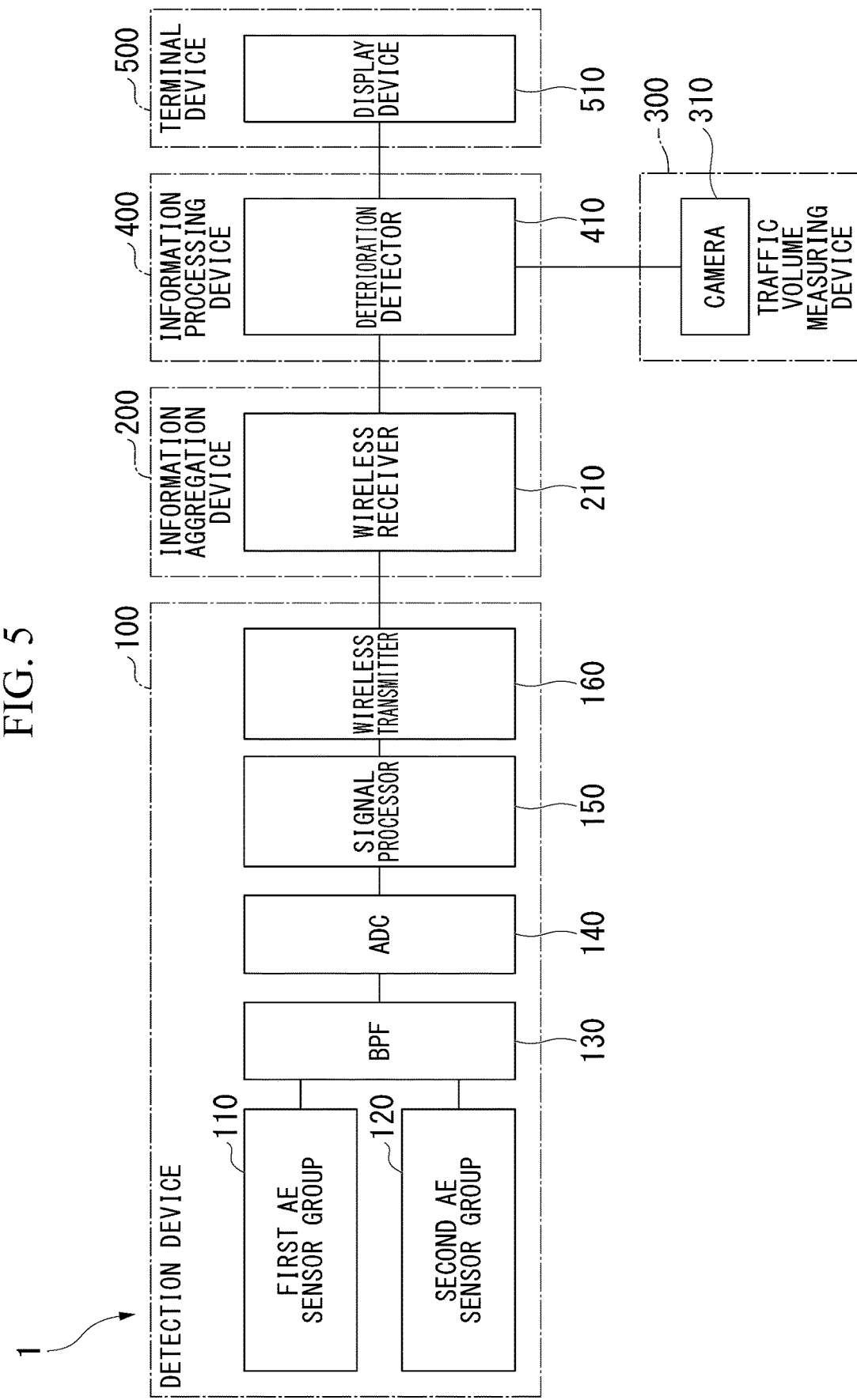
FIG. 5 is a block diagram illustrating a system configuration of a detection system of the first embodiment.

FIG. 5 is a block diagram illustrating a system configuration of the detection system 1 of the present embodiment.

As shown in FIG. 5, the detection system 1 includes, for example, one or more (for example, a plurality of) detection devices 100, an information aggregation device 200, a traffic volume measuring device 300, an information processing device 400, and a terminal device 500.

First, the detection device 100 will be described.

The detection device 100 is an acoustic emission (AE)-type detection device, installed in the bridge structure 10, which detects an elastic wave generated in the bridge structure 10. Meanwhile, AE refers to a phenomenon in which an elastic wave is generated inside a material in association with the generation of a fatigue crack in the material or the development of the fatigue crack. The AE-type detection device detects, for example, an elastic wave generated in association with the generation of a fatigue crack in a structure or the development of the fatigue crack, using a high-sensitive sensor, and detects the state of the structure on the basis of the detected elastic wave.

Specifically, the detection device 100 of the present embodiment includes, for example, a first AE sensor group 110, a second AE sensor group 120, a bandpass filter (BPF) 130, an analog-digital converter (ADC) 140, a signal processor 150, and a wireless transmitter 160.

Figure 6:
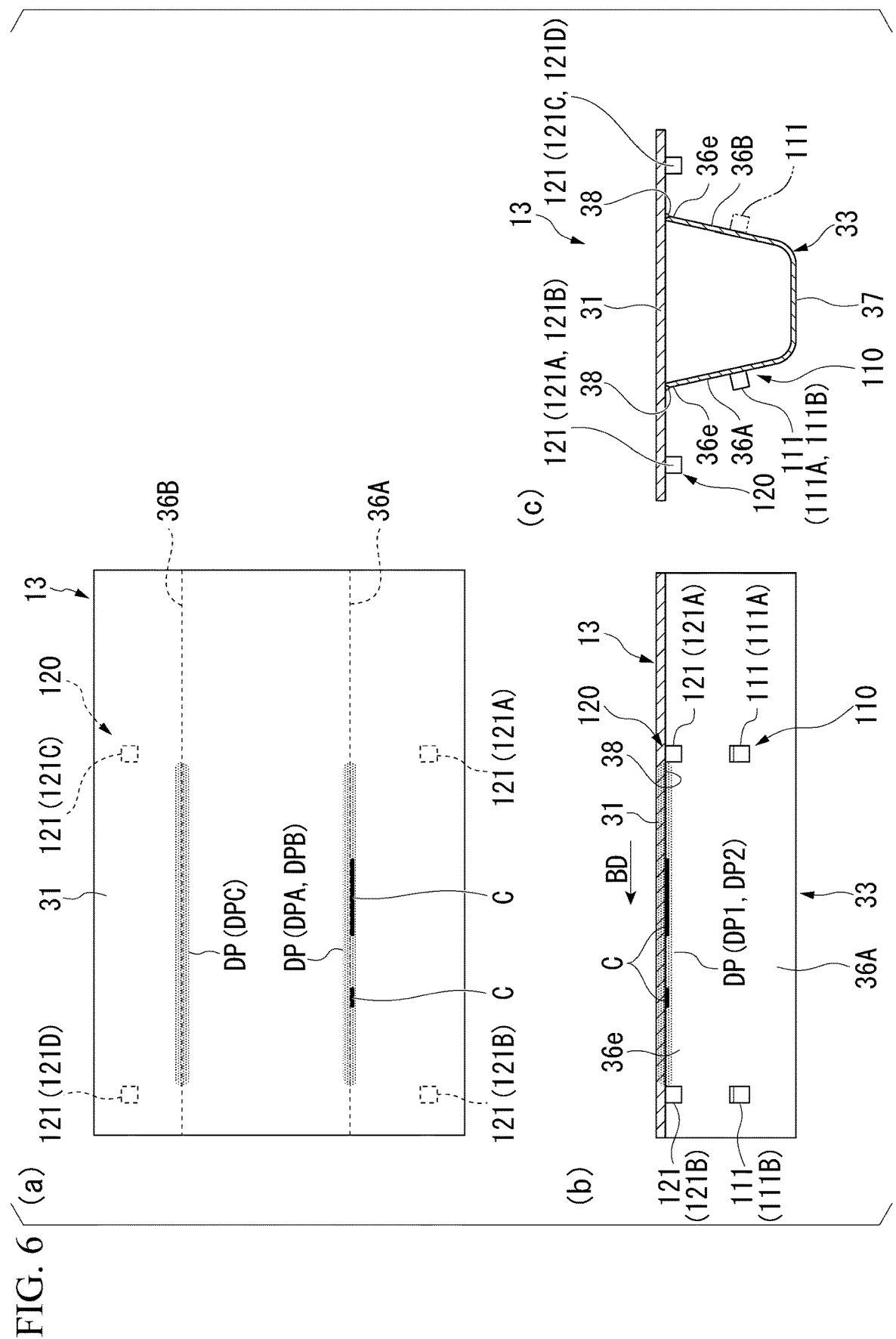
FIG. 6 is a diagram illustrating an arrangement example of first and second AE sensor groups of the first embodiment.

FIG. 6 is a diagram illustrating an arrangement example of the first and second AE sensor groups 110 and 120. Meanwhile, part (a) of FIG. 6 shows a plan view of the steel plate deck 13. Part (b) of FIG. 6 shows a side view of the steel plate deck 13. Part (c) of FIG. 6 shows a cross-sectional view of the steel plate deck 13.

First, the first AE sensor group 110 will be described.

As shown in FIG. 6, the first AE sensor group 110 includes a plurality of AE sensors 111 (for example, two AE sensors 111A and 111B). Meanwhile, the first AE sensor group 110 may include, for example, three or more AE sensors 111 disposed at a predetermined interval in the bridge axial direction BD.

Here, the AE sensor 111 according to the present embodiment will be described.

The AE sensor 111 includes a piezoelectric element, detects an elastic wave (AE wave) transmitted from a generation portion of the crack C, and converts the detected elastic wave into a voltage signal (AE signal) to output the converted signal. The AE signal is detected as an indication before the fracture of a material occurs. Therefore, the frequency of occurrence and signal intensity of the AE signal are useful as an index indicating the integrity of a material. For example, the AE sensor 111 includes a piezoelectric element having sensitivity in a range of 10 kHz to 1 MHz Meanwhile, the AE sensor 111 may be any of a resonance type having a resonance peak within the above frequency range, a broadband type in which resonance is suppressed, and the like. In addition, the AE sensor 111 may be a pre-amplifier type having a pre-amplifier built-in, or may be other than this. The detection element itself of the AE sensor 111 may be any of a voltage output type, a resistance change type, and a capacitance type, or may be other than these. Meanwhile, an acceleration sensor may be used instead of the AE sensor 111.

As shown in FIG. 6, each of the plurality of AE sensors 111 included in the first AE sensor group 110 is installed on the trough rib 23. Specifically, each AE sensor 111 is installed on the lateral side of the upright standing portion 36A of the longitudinal rib 33, and is in contact with the upright standing portion 36A. Thereby, each AE sensor 111 detects an elastic wave which is transmitted from the crack C to the upright standing portion 36A of the longitudinal rib 33.

The plurality of AE sensors 111 are disposed separately from each other in the bridge axial direction BD. That is, the plurality of AE sensors 111 are disposed separately from each other in a direction in which the welded portion 38 extends. The plurality of AE sensors 111 are disposed, for example, at the same height as shown in part (b) of FIG. 6. Meanwhile, the plurality of AE sensors 111 may be disposed at heights different from each other. In addition, a place in which the AE sensor 111 is installed is not limited to the upright standing portion 36A of the longitudinal rib 33. For example, the AE sensor 111 may be installed on the horizontal portion 37 of the longitudinal rib 33. In addition, the detection device 100 may include one or more AE sensors 111 installed on the upright standing portion 36B of the longitudinal rib 33 in addition to one or more AE sensors 111 installed on the upright standing portion 36A of the longitudinal rib 33.

Next, the second AE sensor group 120 will be described.

As shown in FIG. 6, the second AE sensor group 120 includes a plurality of AE sensors 121 (for example, four AE sensors 121A, 121B, 121C, and 121D). Meanwhile, the second AE sensor group 120 may include three or less AE sensors 121, or may include five or more AE sensors 121.

As shown in FIG. 6, each of the plurality of AE sensors 121 included in the second AE sensor group 120 is installed on the deck plate 31. Specifically, each AE sensor 121 is installed on the lower surface of the deck plate 31, and is in contact with the deck plate 31. Thereby, each AE sensor 121 detects an elastic wave which is transmitted from the crack C to the deck plate 31.

The plurality of AE sensors 121 are disposed separately from each other in the bridge axial direction BD and in a direction intersecting (for example, substantially orthogonal to) the bridge axial direction BD. That is, some AE sensors 121 included in the second AE sensor group 120 are disposed separately from each other in a direction in which the welded portion 38 extends. In addition, some AE sensors 121 included in the second AE sensor group 120 are disposed separately on both sides of the longitudinal rib 33 in a direction intersecting (for example, substantially orthogonal to) the bridge axial direction BD. Meanwhile, hereinafter, the direction intersecting (for example, substantially orthogonal to) the bridge axial direction BD is simply called a "width direction."

Here, for convenience of description, in the AE sensors 111 and 121 shown in FIG. 6, two AE sensors 111 included in the first AE sensor group 110 are called a first AE sensor 111A and a second AE sensor 111B, respectively. One inspection object region DPA is set between the first AE sensor 111A and the second AE sensor 111B in the bridge axial direction BD. The inspection object region DPA is set at the boundary between the deck plate 31 and the longitudinal rib 33 (for example, the welded portion 38). In addition, for convenience of description, four AE sensors 121 included in the second AE sensor group 120 are called a third AE sensor 121A, a fourth AE sensor 121B, a fifth AE sensor 121C, and a sixth AE sensor 121D, respectively. One inspection object region DPB is set between the third AE sensor 121A and the fourth AE sensor 121B in the bridge axial direction BD. One inspection object region DPC is set between the fifth AE sensor 121C and the sixth AE sensor 121D in the bridge axial direction BD. Each of the inspection object regions DPB and DPC is set at the boundary between the deck plate 31 and the longitudinal rib 33 (for example, the welded portion 38). In the present embodiment, since the inspection object region DPA and the inspection object region DPB overlap each other, these inspection object regions may be handled as one inspection object region DP. Meanwhile, hereinafter, in a case where the inspection object regions DPA, DPB, and DPC need not be distinguished from each other, they are simply called an "inspection object region DP."

Figure 7:
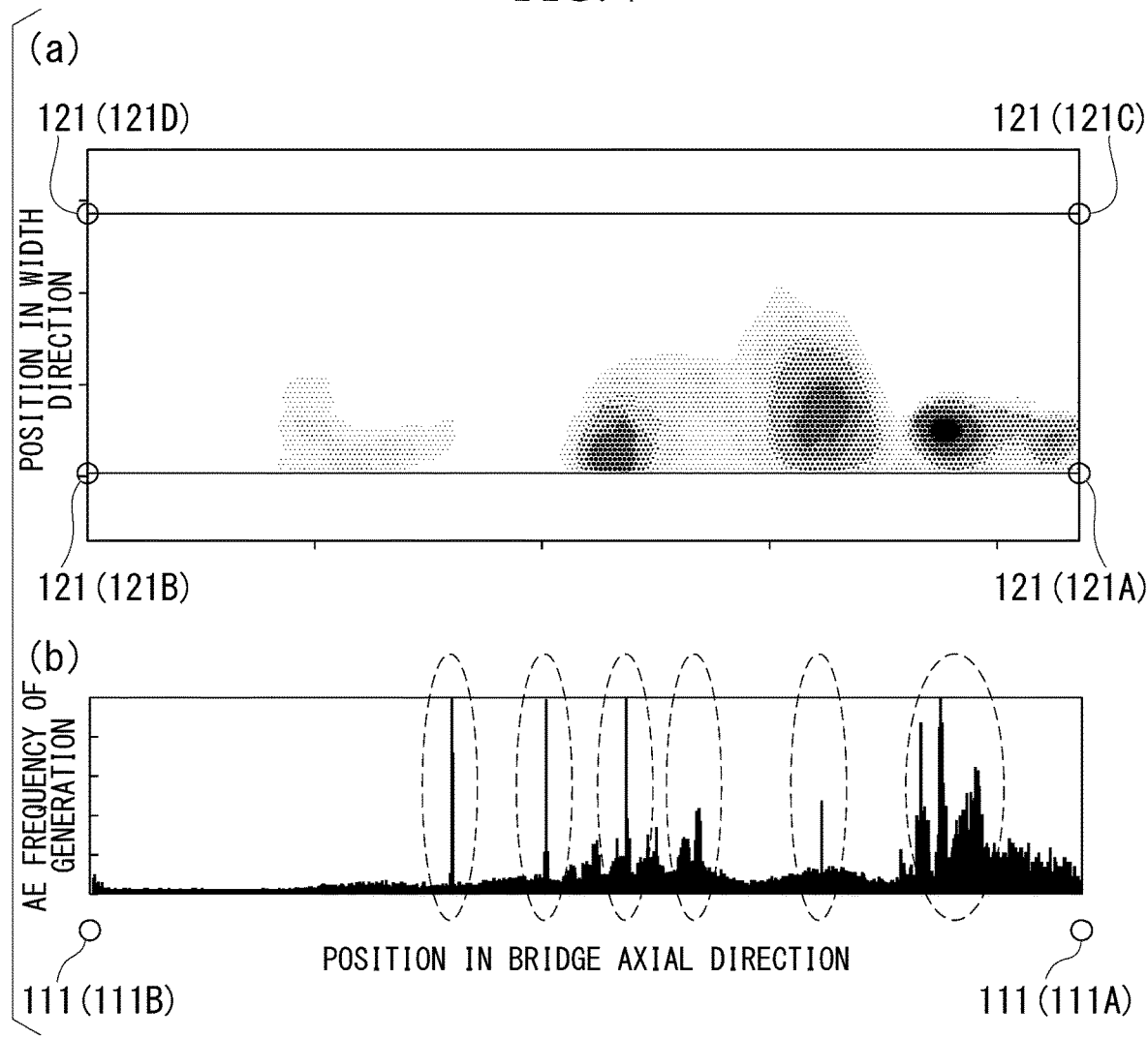
FIG. 7 is a diagram illustrating an example of detection results of the detection system of the first embodiment.

FIG. 7 shows an example of actual detection results of the detection system 1. That is, FIG. 7 is a diagram in which signals detected by the AE sensors 111 and 121 included in the first and second AE sensor groups 110 and 120 in the arrangement example of FIG. 6 are analyzed, and the detection results of the AE frequency of generation (elastic wave generation distribution) in each position are displayed. Meanwhile, part (a) of FIG. 7 shows the detection results of the AE frequency of generation based on the second AE sensor group 120 (the AE sensors 121 installed on the deck plate 31). In part (a) of FIG. 7, as a color in the drawing becomes darker, a higher AE frequency of generation is shown. On the other hand, part (b) of FIG. 7 shows the detection results of the AE frequency of generation based on the first AE sensor group 110 (the AE sensors 111 installed on the longitudinal rib 33). In part (b) of FIG. 7, as a bar graph in the drawing becomes higher, a higher AE frequency of generation is shown.

As described above, in a case where the crack C is generated in the welded portion 38, an elastic wave is generated. This elastic wave propagates from the crack C to the deck plate 31 and the longitudinal rib 33. Here, noise may be applied to the bridge structure 10 from the vehicle V traveling along the traveling surface TS. In addition, directions in which the elastic wave propagates more intensively may be different from each other due to a difference in the progress direction of the crack C, the penetration state of welding, or the like.

Here, it has been found by the inventors' research that even an elastic wave which is not capable of being detected in the AE sensors 121 installed on the deck plate 31 can be detected by installing the AE sensors 111 on the longitudinal rib 33. That is, as shown in FIG. 7, it can be understood that even in a plurality of places in which an elastic wave is not detected in the AE sensor 121 installed on the deck plate 31, an elastic wave associated with the crack C is able to be detected by the AE sensors 111 installed on the longitudinal rib 33. That is, it has been found that the installation of the AE sensors 111 on the longitudinal rib 33 increases the accuracy of detection of the crack C.

Next, a method of locating a generation source position of an elastic wave (a position of the crack C) will be described.

In the present embodiment, the generation source position of an elastic wave is located using the detection results of two AE sensors 111A and 111B next to each other included in the first AE sensor group 110. Meanwhile, the term "locating" referred to in the present application means, for example, obtaining (calculating or specifying) the position or the like of a target on the basis of the detection results of the sensors. Meanwhile, the location method to be described below is true of the second AE sensor group 120.

Figure 8:
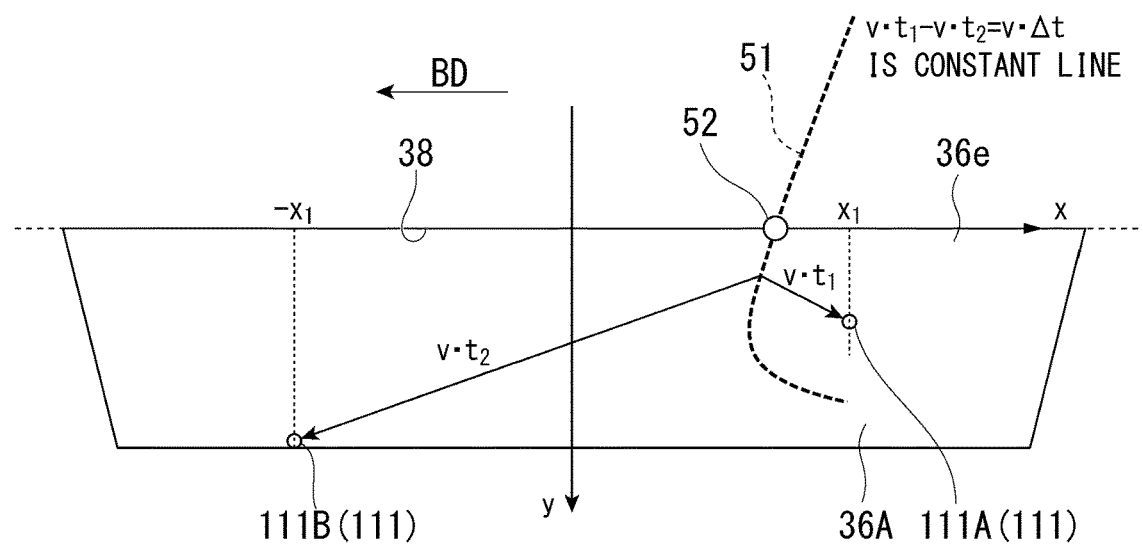
FIG. 8 is a side view conceptually illustrating a method of locating a crack position of the first embodiment.

FIG. 8 is a side view conceptually illustrating a method of locating a generation source position of an elastic wave.

As shown in FIG. 8, in the present embodiment, the generation source position of an elastic wave is located on the basis of a time difference between times at which two AE sensors 111A and 111B detect an elastic wave, the propagation velocity of the elastic wave in the longitudinal rib 33, and the position of the welded portion 38. Meanwhile, FIG. 8 shows an example in which the two AE sensors 111A and 111B are disposed at different heights.

Specifically, the curve of a broken line shown in FIG. 8 is a hyperbolic curve 51 using the two AE sensors 111A and 111B as focuses. That is, in each point located on the line of the hyperbolic curve 51, a difference between distances from the two AE sensors 111A and 111B with respect to the hyperbolic curve 51 is constant. In other words, when the propagation velocity of the elastic wave in the longitudinal rib 33 is set to v, and a time difference (t1−t2) between a time (t1) at which the first AE sensor 111A detects the elastic wave and a time (t2) at which the second AE sensor 111B detects the elastic wave is set to Δt, the hyperbolic curve 51 is a line linking points at which v×Δt becomes constant. Meanwhile, the wording "time at which a sensor detects an elastic wave" referred to in the present application may be replaced by the wording "time at which an elastic wave reaches a sensor."

Here, the crack C can be presumed to occur in the welded portion 38. In addition, the welded portion 38 is linearly provided along the end portion 36e of the longitudinal rib 33. Therefore, as shown in FIG. 8, regarding a point of intersection (intersection portion) 52 between the hyperbolic curve 51 and the welded portion 38, only one point is determined. The point of intersection 52 at which the hyperbolic curve 51 and the welded portion 38 intersect each other can be located as the generation source position of an elastic wave. Thereby, even when the AE sensor 111 is installed in a place away from the welded portion 38, the position of the crack C can be accurately located.

Here, when the volume elastic modulus of a material is set to κ (Pa), and its density is set to $\rho_0$ (kg/m$^3$), the propagation velocity v of an elastic wave propagating through the material can be represented by the following expression.

$$v = \sqrt{\frac{\kappa}{\rho_0}}$$ [Expression 1]

In addition, in the case of a three-dimensional object, when its shear elastic modulus is set to G, the following expression can be represented.

$$v = \sqrt{\frac{1}{\rho_0} \cdot \left(\kappa + \frac{4}{3}G\right)}$$ [Expression 2]

This means that the propagation velocity v of an elastic wave propagating through a material is determined by a physical value intrinsic to the material. Therefore, it is possible to calculate the propagation velocity v of an elastic wave in advance with respect to a material, and to prepare a look-up table. That is, in a case where the propagation velocity v is selected in the calculation of the position location of the crack C, it is possible to appropriately select a propagation velocity depending on a material by referring to the look-up table.

Next, referring back to FIG. 5, the BPF 130, the ADC 140, the signal processor 150, and the wireless transmitter 160 of the detection device 100 will be described.

The bandpass filter (BPF) 130 is provided between the first and second AE sensor groups 110 and 120 and the ADC 140. Voltage signals which are output from the AE sensors 111 and 121 of the first and second AE sensor groups 110 and 120 are input to the BPF 130, and noise components except for a signal band are removed.

The analog-digital converter (ADC) 140 is provided between the BPF 130 and the signal processor 150. A signal having passed through the BPF 130 is input to the ADC 140. The signal which is input to the ADC 140 is input to the signal processor 150 as discretized waveform data.

The signal processor (signal processing circuit) 150 is formed by, for example, a field programmable gate array (FPGA). For example, in a case where the signal processor 150 is formed by a non-volatile FPGA, it is possible to suppress power consumption during standby. Meanwhile, the signal processor 150 may be formed by an exclusive LSI.

Figure 9:
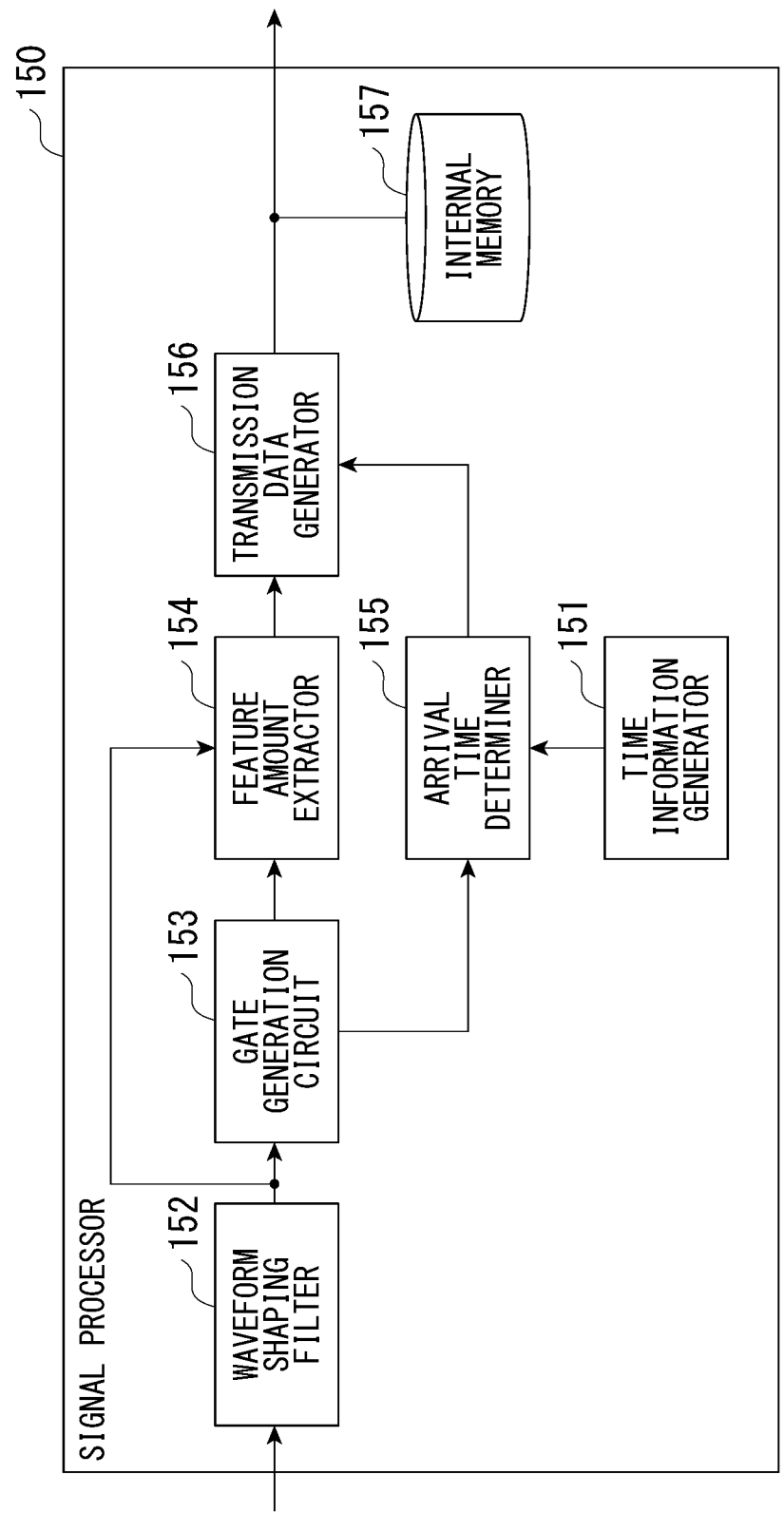
FIG. 9 is a block diagram illustrating a system configuration of a signal processor of the first embodiment.

FIG. 9 is a block diagram illustrating a system configuration of the signal processor 150.

As shown in FIG. 9, the signal processor 150 includes, for example, a time information generator 151, a waveform shaping filter 152, a gate generation circuit 153, a feature amount extractor 154, an arrival time determiner 155, a transmission data generator 156, and an internal memory 157.

The time information generator 151 generates cumulative time information from the time of power-on of the detection device 100 on the basis of a signal from a clock source such as a crystal oscillator. For example, the time information generator 151 includes a counter that counts the edge of a clock, and sets the value of a register of the counter to time information.

Specifically, the register of the counter has a predetermined bit length b. When a time resolution is set to dt, and a continuous measurement time is set to y, the predetermined bit length b is an integer for satisfying the following relation.

$$2^b \geq y/dt$$ [Expression 3]

That is, the bit length b is determined from the time resolution dt and the continuous measurement time y.

In addition, when the propagation velocity of the elastic wave based on the material of the bridge structure 10 (for example, the material of the longitudinal rib 33) is set to v, and position location accuracy is set to dr, the time resolution dt is obtained from the following relation.

$$dt = dr/v$$ [Expression 4]

That is, the time resolution dt is determined from the propagation velocity v of the elastic wave and the position location accuracy dr. In other words, by determining the bit length b on the basis of the position location accuracy dr, it is possible to set the position location accuracy dr to an arbitrary range, and to realize a necessary and sufficient position location.

For example, in a case where a structure which is a target is assumed to be made of iron, the relation of the propagation velocity v of the elastic wave=5,950 [m/s] is established. When the position location accuracy of the generation source of the elastic wave is set to 3 mm, and the number of years of continuous measurement is set to 100, the relation of dt=0.50 [μsec] is established.

Thereby, the relation of b≥53 bits is established.

Here, regarding the transmission packet of a general wireless module, data transmission is performed in units of bytes. Therefore, the bit length b is set to a multiple of 8 for satisfying Expression (4). That is, the relation of the bit length b≥56 bits=7 bytes is established, and thus it is possible to use a general-purpose wireless module.

The waveform shaping filter 152 is provided between the ADC 140 and the gate generation circuit 153. A signal (waveform data) which is input from the ADC 140 to the signal processor 150 passes through the waveform shaping filter 152. The signal having passed through the waveform shaping filter 152 is input to the gate generation circuit 153 and the feature amount extractor 154.

The gate generation circuit 153 extracts a series of continuous waveforms. The gate generation circuit 153 includes, for example, an envelope detector and a comparator. For example, in a case where the detected envelope is equal to or greater than a predetermined threshold, the gate generation circuit 153 outputs a gate signal which is set to be high (H). On the other hand, in a case where the detected envelope falls below the threshold, the gate generation circuit 153 outputs to a gate signal which is set to be low (L).

In a case where the gate signal which is output from the gate generation circuit 153 is set to be H, the feature amount extractor 154 processes waveform data, and extracts the feature amount of the waveform shape of the elastic wave (parameter featuring the waveform shape). The feature amount of the waveform shape is an example of "information relating to the characteristics of the elastic wave." In each elastic wave, the feature amount extractor 154 extracts, for example, at least one value of the amplitude of a signal, energy, a rising time, a time duration, a frequency, a zero cross count number and the like, as the feature amount of the waveform shape. Meanwhile, "information relating to certain contents (for example, the characteristics of the elastic wave)" referred to in the present application may be information include the contents directly, or may be information in which the contents can be extracted by arithmetic processing, determination processing or the like which is set in advance being performed.

Figure 10:
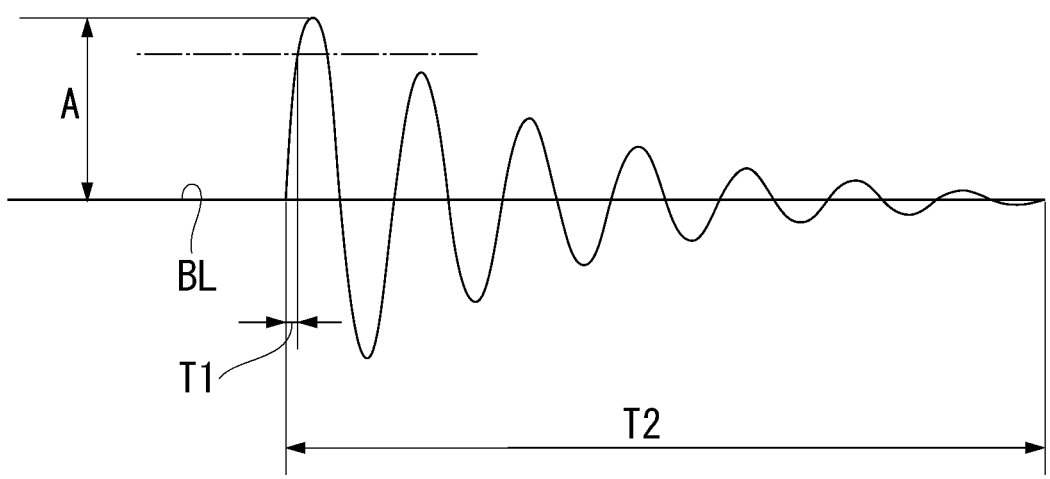
FIG. 10 is a diagram illustrating parameters relating to the characteristics of an elastic wave of the first embodiment.

FIG. 10 shows a specific example of parameters relating to the characteristics of the elastic wave.

As shown in FIG. 10, the term "amplitude of a signal" refers to, for example, a value of a maximum amplitude A in the elastic wave. The term "energy" refers to, for example, a value obtained by performing time integration on a value obtained by raising an amplitude to the second power at each point in time. Meanwhile, the definition of the "energy" is not limited to the above example, and may be approximated using, for example, the envelope of a waveform. The term "rising time" refers to, for example, a time T1 which is taken until the elastic wave rises in excess of a predetermined value which is set in advance from a zero value. The term "time duration" refers to, for example, a time T2 which is taken until the amplitude becomes smaller than a value which is set in advance from the rising start of the elastic wave. The term "frequency" refers to a frequency of the elastic wave. The term "zero cross count number" refers to, for example, the number of times by which the elastic wave traverses the reference line BL passing through a zero value.

The feature amount extractor 154 extracts the feature amount of the waveform shape of the elastic wave in each of the AE sensors 111 and 121 on the basis of the detection result of each of the AE sensors 111 and 121. The feature amount extractor 154 sends information relating to the extracted feature amount of the waveform shape in each of the AE sensors 111 and 121 to the transmission data generator 156.

On the other hand, as shown in FIG. 9, the arrival time determiner 155 receives time information from the time information generator 151. In addition, the arrival time determiner 155 receives a gate signal indicating the presence or absence of an AE signal from the gate generation circuit 153. The arrival time determiner 155 generates arrival time information of the elastic wave on the basis of the time information received from the time information generator 151 and the gate signal received from the gate generation circuit 153. For example, the arrival time determiner 155 sets the time information when the rising edge of the gate signal is generated, to the arrival time of the elastic wave.

The arrival time determiner 155 calculates the arrival time of the elastic wave with respect to each of the AE sensors 111 and 121 on the basis of the detection result of each of the AE sensors 111 and 121. The arrival time determiner 155 sends information relating to the calculated arrival time of the elastic wave with respect to each of the AE sensors 111 and 121 to the transmission data generator 156.

The transmission data generator 156 associates the information relating to the feature amount of the waveform shape, received from the feature amount extractor 154, in each of the AE sensors 111 and 121 with the information relating to the arrival time of the elastic wave, received from the arrival time determiner 155, in each of the AE sensors 111 and 121, and generates one group of AE data for transmission. The generated AE data is saved in the internal memory 157. The internal memory 157 is, for example, a dual port RAM. Meanwhile, the generated AE data may be sent directly to the wireless transmitter 160 (see FIG. 5) without being saved in the internal memory 157.

Next, the wireless transmitter 160 will be described with reference to FIG. 5.

The wireless transmitter (wireless transmitting circuit) 160 includes, for example, an antenna and a wireless module that generates a high-frequency signal. The wireless transmitter 160 wirelessly transmits the AE data at a predetermined timing which is set in advance. The wireless transmitter 160 is an example of an "output unit", and outputs information obtained from outputs of the AE sensors 111 and 121 to the outside. Meanwhile, the wireless transmitter 160 may be referred to as a "transmitter." In addition, the "information obtained from the output of the AE sensors" may be the voltage signal itself which is output from the AE sensor, or may be obtained by performing noise processing, arithmetic processing, determination processing or the like, which is set in advance, on the voltage signal. In addition, in a case where a deterioration detector 410 to be described later is provided within the detection device 100 instead of the information processing device 400, the "information obtained from an output of the AE sensor" which is output by the wireless transmitter 160 may include information relating to the presence or absence of the deterioration of the bridge structure 10 or the degree of deterioration thereof.

In the present embodiment, the wireless transmitter 160 transmits information relating to the feature amount of the waveform shape of the elastic wave in each of the AE sensors 111 and 121 and the information relating to the arrival time of the elastic wave in each of the AE sensors 111 and 121, as information obtained from outputs of the AE sensors 111 and 121 in association therewith.

Next, the information aggregation device 200 will be described.

As shown in FIG. 5, the information aggregation device 200 includes a wireless receiver (wireless receiving circuit) 210. The wireless receiver 210 includes, for example, an antenna and a wireless module that processes a high-frequency signal. One information aggregation device 200, for example, is provided in one bridge structure 10. In addition, the wireless receiver 210 includes a storage DB which is not shown. The wireless receiver 210 receives the AE data from one or more (for example, a plurality of) detection devices 100 installed in the bridge structure 10, and saves the received AE data in the storage DB. The data saved in the storage DB is transmitted to the information processing device 400, for example, in a predetermined period.

Next, the traffic volume measuring device 300 will be described.

The traffic volume measuring device 300 is installed on, for example, the bridge structure 10, and measures the traffic volume of vehicles V (for example, the number of vehicles V) passing through the bridge structure 10. The traffic volume measuring device 300 includes, for example, a camera 310 that takes pictures of the vehicles V that travel on the traveling surface TS. Meanwhile, the traffic volume measuring device 300 may include an ultrasonic sensor or the like that detects the vehicles V that travel on the traveling surface TS instead of the camera 310. For example, the traffic volume measuring device 300 measures the traffic volume of the vehicles V in distinction of the types (for example, small-size vehicles, medium-size vehicles, and large-size vehicles) of traveling vehicles V. In addition, in a case where the traveling surface TS has a plurality of lanes, the traffic volume measuring device 300 measures the traffic volume of the vehicles V for each lane. Data indicating the traffic volume measured by the traffic volume measuring device 300 is transmitted to the information processing device 400, for example, in a predetermined period.

The information processing device 400 is, for example, an electronic device (for example, a server) which is installed in the management office of an organization that manages the bridge structure 10 or installed on a network. The information processing device 400 includes the deterioration detector 410 that detects the state of the bridge structure 10. The information processing device 400 is an example of a "computer." Meanwhile, the information processing device 400 will be described later in detail.

The terminal device 500 is, for example, a personal computer which is installed in the management office of an organization that manages the bridge structure 10. The terminal device 500 includes a display device 510. The display device 510 is, for example, a liquid crystal display or an organic electro luminescence (EL) display, and can display data detected by the deterioration detector 410 of the information processing device 400. The display device 510 may be referred to as a "displayer." In addition, the display device 510 may be provided as a portion of the information processing device 400 instead of the terminal device 500.

Next, the deterioration detector 410 of the information processing device 400 will be described in detail.

Figure 11:
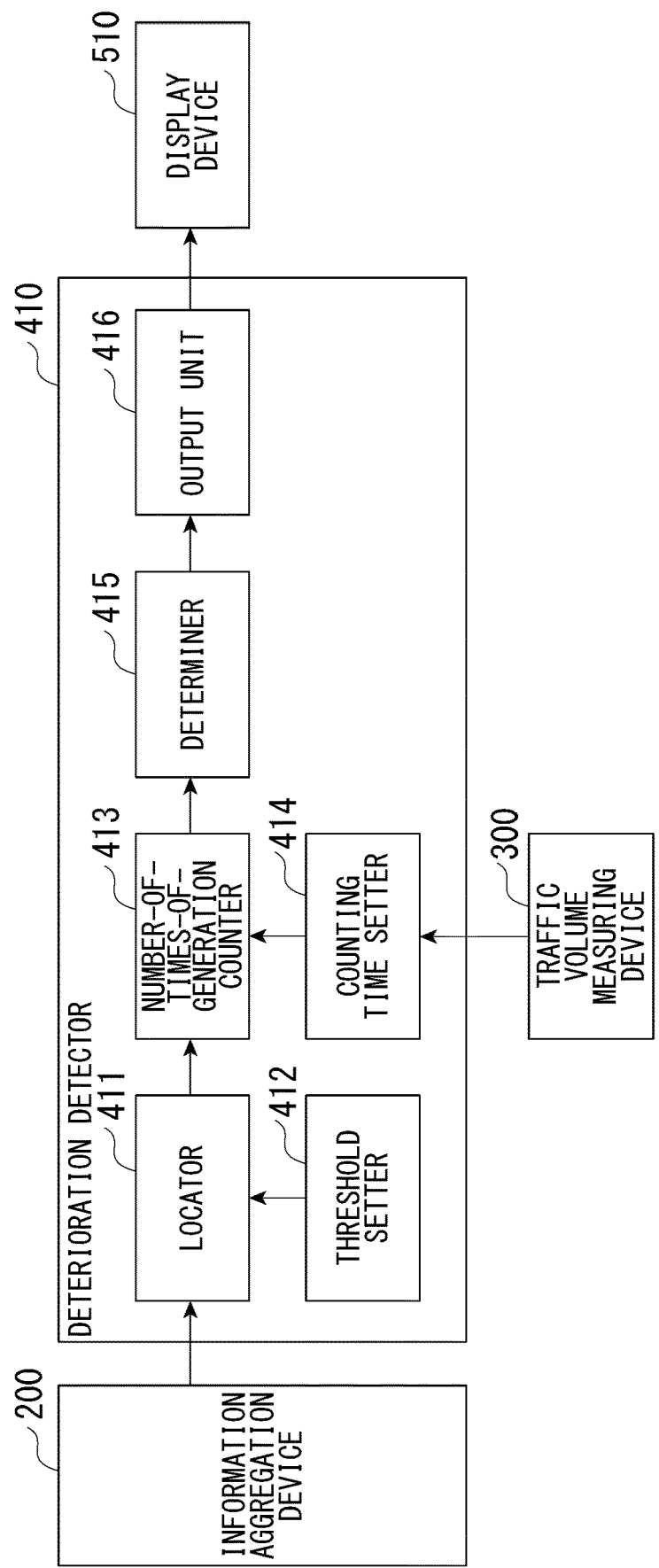
FIG. 11 is a block diagram illustrating a system configuration of a deterioration detector of the first embodiment.

FIG. 11 is a block diagram illustrating a system configuration of the deterioration detector 410. The deterioration detector 410 includes, for example, a locator 411, a threshold setter 412, a number-of-times-of-generation counter 413, a counting time setter 414, a determiner 415, and an output unit 416. All or some of these functional units are realized by a hardware processor such as a central processing unit (CPU) or a graphics processing unit (GPU) executing a program (software) stored in a storage unit. However, some or all of these functional units may be realized by hardware (a circuit unit; including circuitry) such as an application specific integrated circuit (ASIC), a programmable logic device (PLD), or an FPGA, or may be realized by software and hardware in cooperation. These are true of each functional unit of deterioration detectors 410 of second to sixth embodiments to be described later.

First, the locator 411 and the threshold setter 412 will be described.

The locator 411 locates the generation source position of the elastic wave detected by the first AE sensor group 110, and locates the generation source position of the elastic wave detected by the second AE sensor group 120. Specifically, the locator 411 compares pieces of information relating to the feature amount of the waveform shape of the elastic wave in each of the AE sensors 111 and 121, to thereby determine whether the elastic waves detected by the respective AE sensors 111 and 121 are the same as each other by. That is, the locator 411 compares at least one (for example, two or more) of the amplitude, energy, rising time, time duration, frequency, zero cross count number and the like of a signal of the elastic wave detected by each of the AE sensors 111 and 112 (for example, the AE sensors 111A and 111B), to thereby determine whether the elastic waves detected by the respective AE sensors 111 and 112 (for example, the AE sensors 111A and 111B) are the same as each other.

In a case where the similarity between the feature amounts of the waveform shapes of the elastic waves (the similarity between waveform shapes) in the plurality of AE sensors 111 (or the plurality of AE sensors 121) is in a predetermined range which is set in advance, the locator 411 determines that the elastic waves detected by the plurality of AE sensors 111 (or the plurality of AE sensors 121) are the same elastic wave, and locates the generation source position of the elastic wave. Meanwhile, the determination of the similarity between the elastic waves is separately performed in the AE sensor 111 installed on the longitudinal rib 33 and the AE sensor 121 installed on the deck plate 31. This is, for example, because the plate thickness of the longitudinal rib 33 and the plate thickness of the deck plate 31 are different from each other, because the waveform shape of the elastic wave which is input to the AE sensor 111 and the waveform shape which is input to the AE sensor 121 are different from each other, and because the deck plate 31 is covered with the pavement portion 32.

Specifically, as described above with reference to FIG. 8, the locator 411 locates the generation source position of the elastic wave on the basis of, for example, a time difference between times at which two AE sensors 111A and 111B detect the elastic waves, the propagation velocity of the elastic wave in the longitudinal rib 33, and the position of the welded portion 38. That is, the locator 411 locates the point of intersection 52 between the hyperbolic curve 51 and the welded portion 38 in FIG. 8 as the generation source position of the elastic wave.

In addition, the locator 411 performs noise processing associated with the position location. The locator 411 is an example of a noise removal portion that removes noise on the basis of a predetermined algorithm which is set in advance. For example, the locator 411 receives a threshold which is a criterion for the determination of noise processing from the threshold setter 412. The threshold stored in the threshold setter 412 can be changed by a user. The locator 411 presumes the elastic wave determined to occur from outside of a range of a predetermined threshold, as noise, based on the position location result. In this manner, in noise removal, it is determined whether the elastic wave is a noise or a significant signal, on the basis of a predetermined threshold. Therefore, it is possible to flexibly change threshold conditions by noise processing being performed on the server side. That is, it is possible to add many conditions such as conditions of an installation status and a measurement target, climate conditions, and flexibly set thresholds. Thereby, it is possible to more effectively remove noise.

Next, the number-of-times-of-generation counter 413 and the counting time setter 414 will be described.

The number-of-times-of-generation counter 413 accumulates information of the generation source positions of a plurality of elastic waves located by the locator 411 over a predetermined counting time (measurement time), to thereby calculate the distribution of the generation source positions of the plurality of elastic waves (the distribution of the number of hits). Meanwhile, the wording "the distribution of the generation source positions of elastic waves" may be referred to as the wording "the distribution density of the generation source positions of elastic waves." The number-of-times-of-generation counter 413 is an example of a "first counter." The predetermined counting time is an example of a "predetermined time." Hereinafter, for convenience of description, the wording "the distribution of the generation source positions of elastic waves" is referred to as the wording "elastic wave generation distribution."

Figure 12:
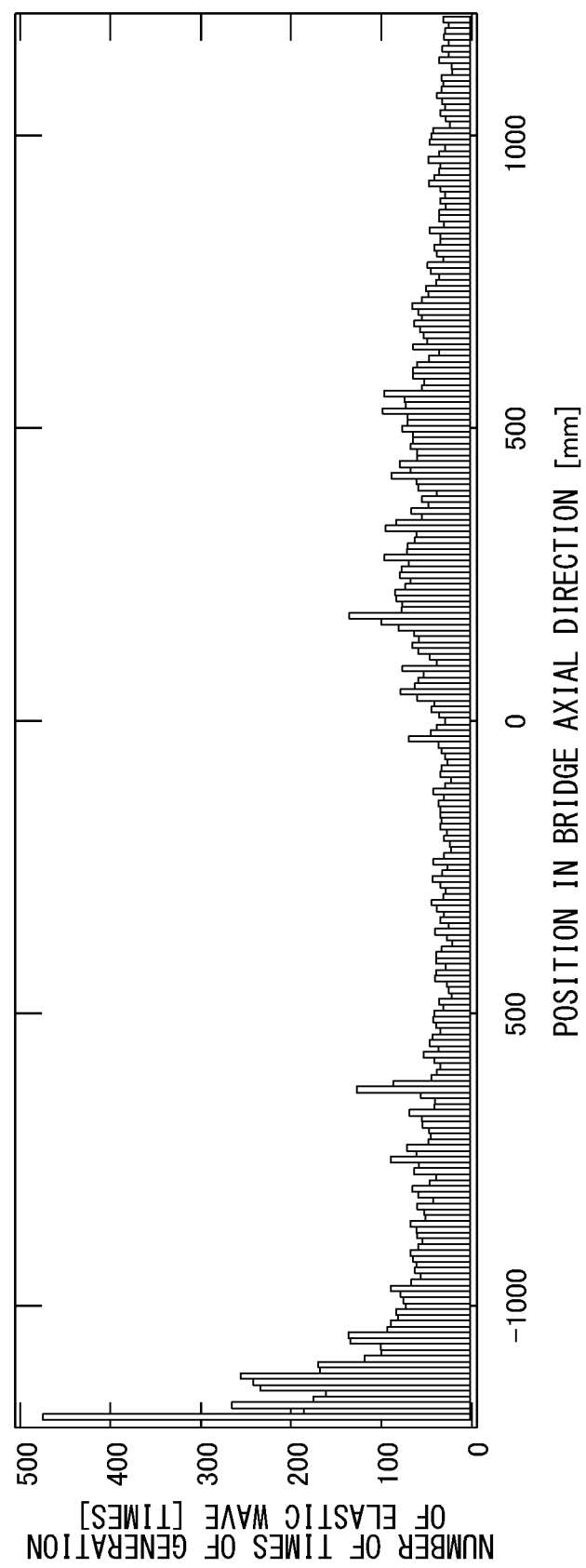
FIG. 12 is a diagram illustrating an example of elastic wave generation distribution of the first embodiment.

FIG. 12 is a diagram illustrating an example of elastic wave generation distribution calculated by the number-of-times-of-generation counter 413. As shown in FIG. 12, the number-of-times-of-generation counter 413 counts the number of times of generation of (the frequency of generation) of an elastic wave generated, for example, at every position of the inspection object region DP in the bridge axial direction BD over the predetermined counting time. Thereby, the elastic wave generation distribution in the inspection object region DP is calculated. When the predetermined counting time elapses, the number-of-times-of-generation counter 413 outputs information indicating the calculated elastic wave generation distribution to the determiner 415.

The counting time setter 414 determines the predetermined counting time on the basis of the traffic volume of the vehicles V passing on the traveling surface TS. In the present embodiment, the counting time setter 414 determines the predetermined counting time on the basis of data indicating the traffic volume of the vehicles V passing on the traveling surface TS measured by the traffic volume measuring device 300.

The counting time setter 414 sets, for example, a first time in which the number of vehicles V passing on the traveling surface TS exceeds a first number of passing vehicles as the predetermined counting time. Here, the vehicles V which are targets for the first number of passing vehicles are vehicles of all types including large-size vehicles or small-size vehicles. The first number of passing vehicles is, for example 16,000.

Meanwhile, the counting time setter 414 may set a second time in which the number of vehicles V of a specific type passing on the traveling surface TS exceeds a second number of passing vehicles, as the predetermined counting time, instead of the first time. Here, the vehicle V of a specific type is, for example, a large-size vehicle. The term "large-size vehicle" referred to in the present application indicates, for example, a type of vehicle having a weight of 1.1 tons or more. The second number of passing vehicles is smaller than the first number of passing vehicles, and is, for example 7,000.

In addition, the counting time setter 414 may set a third time in which the number of vehicles V passing on a lane located directly on the welded portion 38 serving as the inspection object region DP on the traveling surface TS exceeds a third number of passing vehicles, as the predetermined counting time, instead of the first time or the second time. Here, the vehicles V which are targets for the third number of passing vehicles are vehicles of all types including large-size vehicles or small-size vehicles. The third number of passing vehicles is smaller than the first number of passing vehicles, and is, for example 5,300.

Here, the counting time setter 414 may set the shorter of the first time and the second time as the predetermined counting time. In addition, the counting time setter 414 may set the shorter of the first time and the third time as the predetermined counting time. In addition, the counting time setter 414 may set the shortest of the first time, the second time and the third time as the predetermined counting time.

Hereinafter, the basis of the first to third numbers of passing vehicles described above will be described. meanwhile, as a premise, the inventors performs a preliminary experiment on the steel plate deck 13 on which the position of the crack C is confirmed in advance using the detection system 1, and confirms that all cracks C (known cracks C) present in the steel plate deck 13 can be detected in a case where 72 hours of measurement is performed by the detection device 100. In other words, all cracks C (known cracks C) present in the steel plate deck 13 are expressed in the elastic wave generation distribution after 72 hours of measurement. Therefore, the elastic wave generation distribution after 72 hours of measurement can be used as correct response data of the elastic wave generation distribution.

Figure 13:
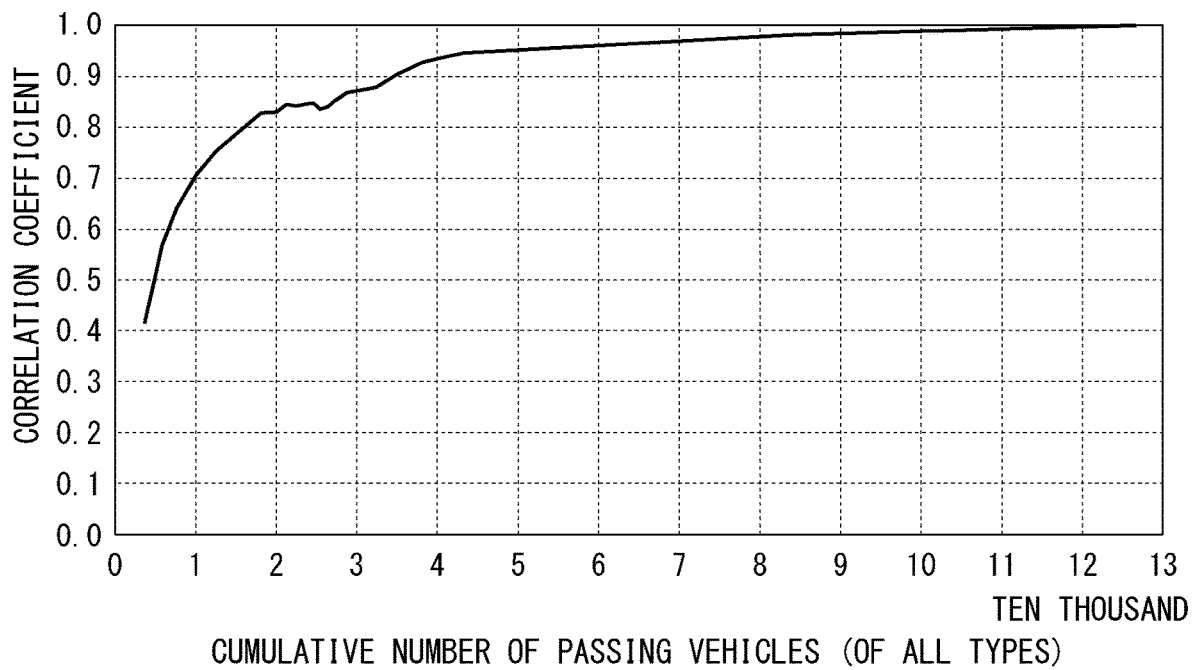
FIG. 13 is a diagram illustrating a change in a correlation coefficient of elastic wave generation distribution for elastic wave generation distribution after 72 hours of measurement in the first embodiment with respect to the cumulative number of passing vehicles (of all types).

FIG. 13 is an experimental result of an experiment performed by the inventors in connection with the present embodiment, and is a diagram illustrating a change in a correlation coefficient of elastic wave generation distribution for elastic wave generation distribution after 72 hours of measurement (correct response data) calculated by the number-of-times-of-generation counter 413 with respect to the cumulative number of passing vehicles (of all types). As shown in FIG. 13, when the correlation coefficient reaches approximately 0.8, it is confirmed that the elastic wave generation distribution at that point in time become very close to a final result of the elastic wave generation distribution after 72 hours of measurement. Therefore, the number of passing vehicles required for the correlation coefficient to reach 0.8 can be considered to be the number of passing vehicles (the first number of passing vehicles) sufficient for the detection of the crack C. As shown in FIG. 13, the first number of passing vehicles is approximately 16,000.

Figure 14:
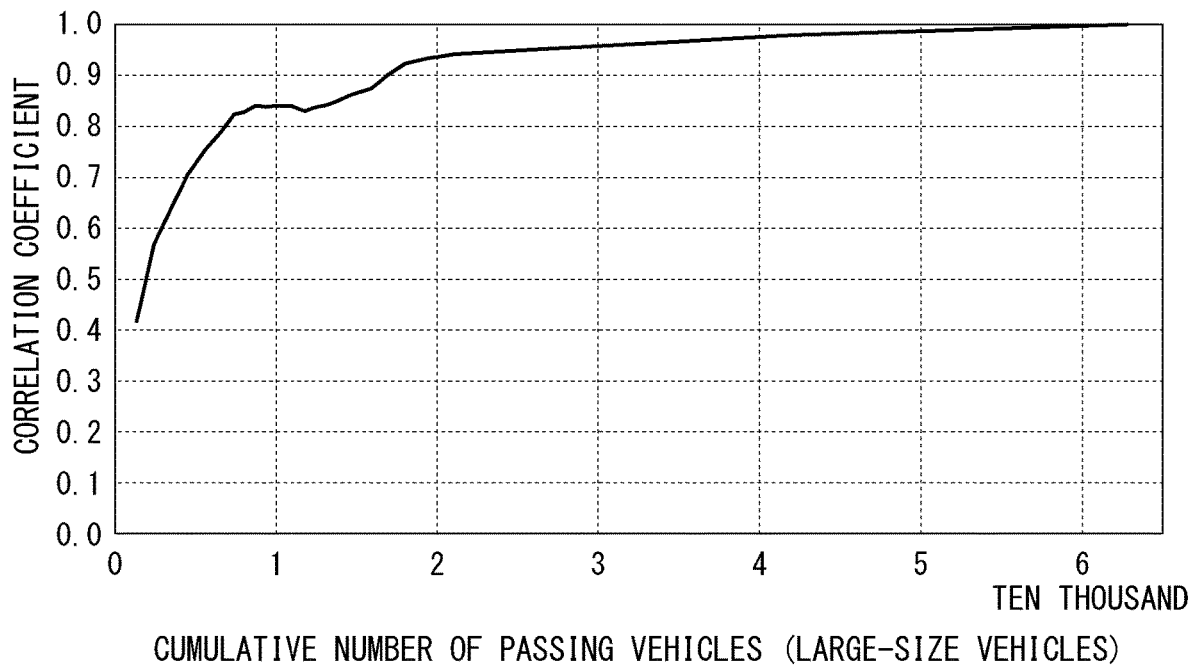
FIG. 14 is a diagram illustrating a change in a correlation coefficient of elastic wave generation distribution for elastic wave generation distribution after 72 hours of measurement in the first embodiment with respect to the cumulative number of passing vehicles (only large-size vehicles).

FIG. 14 is a diagram in which the same analysis as in FIG. 13 is performed with the type of vehicle limited to a large-size vehicle. As shown in FIG. 14, the number of passing large-size vehicles in which the correlation coefficient exceeds 0.8 is approximately 7,000. In the passage of vehicles of types other than a large-size vehicle, since a load applied to the bridge structure 10 is relatively small, the possibility of rare occurrence of an elastic wave caused by the crack C is considered.

In addition, it is considered that, in inducing an elastic wave which is generated from the crack C, the passage of the vehicle V through a lane passing directly on the welded portion 38 is a largest load. Therefore, the traffic volume for determining the predetermined counting time is considered to use the number of passing vehicles according to a lane. Here, the experimental result of FIG. 13 is the number of passing vehicles measured with respect to the steel plate deck 13 of a three-lane road. Therefore, the number of passing vehicles passing through a lane closest to the welded portion 38 in which the elastic wave generation distribution is measured is considered to be a third of the total number of passing vehicles. Therefore, the fact that the correlation coefficient reaches 0.8 is considered to be the case where 5,300 equivalent to a third of 16,000 which is the total number of passing vehicles pass through a lane located directly on the welded portion 38.

As described above, the counting time setter 414 determines the predetermined counting time on the basis of the traffic volume of vehicles V passing on the traveling surface TS, and outputs the determined predetermined counting time to the number-of-times-of-generation counter 413. For example, on the basis of the number of passing vehicles measured by the traffic volume measuring device 300, the counting time setter 414 monitors whether the number of vehicles V (of all types) passing on the traveling surface TS exceeds the first number of passing vehicles, whether the number of vehicles V (for example, large-size vehicles) of a specific type passing on the traveling surface TS exceeds the number of second vehicles, and whether the number of vehicles V passing through a lane located directly on the welded portion 38 serving as the inspection object region DP on the traveling surface TS exceeds the third number of passing vehicles. The counting time setter 414 outputs a signal indicating the elapse of the predetermined counting time to the number-of-times-of-generation counter 413, for example, in a case where the vehicles V (of all types) passing on the traveling surface TS exceed the first number of passing vehicles, a case where the vehicles V (for example, large-size vehicles) of a specific type passing on the traveling surface TS exceeds the second number of passing vehicles, or a case where the vehicles V passing through a lane located directly on the welded portion 38 serving as the inspection object region DP on the traveling surface TS exceeds the third number of passing vehicles. In a case where the signal is received from the counting time setter 414, the number-of-times-of-generation counter 413 completes the calculation of the elastic wave generation distribution.

Next, the determiner 415 will be described.

The determiner 415 determines the position of the crack C on the basis of the elastic wave generation distribution calculated by the number-of-times-of-generation counter 413. For example, the determiner 415 determines that the crack C is present at a position where the number of times of generation of an elastic wave is set to be equal to or greater than a threshold which is set in advance at each position. In other words, the determiner 415 determines that the crack C is present at a position where the number of times of generation of an elastic wave increases locally in the elastic wave generation distribution calculated by the number-of-times-of-generation counter 413. In addition, the determiner 415 may determine the size of the crack C on the basis of the number of times of generation of an elastic wave in the elastic wave generation distribution. The determination result of determiner 415 is output to the output unit 416.

Next, the output unit 416 will be described.

The output unit 416 generates information for causing the display device 510 to display the determination result of the determiner 415, and outputs the generated information to the display device 510. Thereby, the determination result of the determiner 415 is displayed on the display device 510.

Next, a flow of processes of the detection system 1 will be described.

Figure 15:
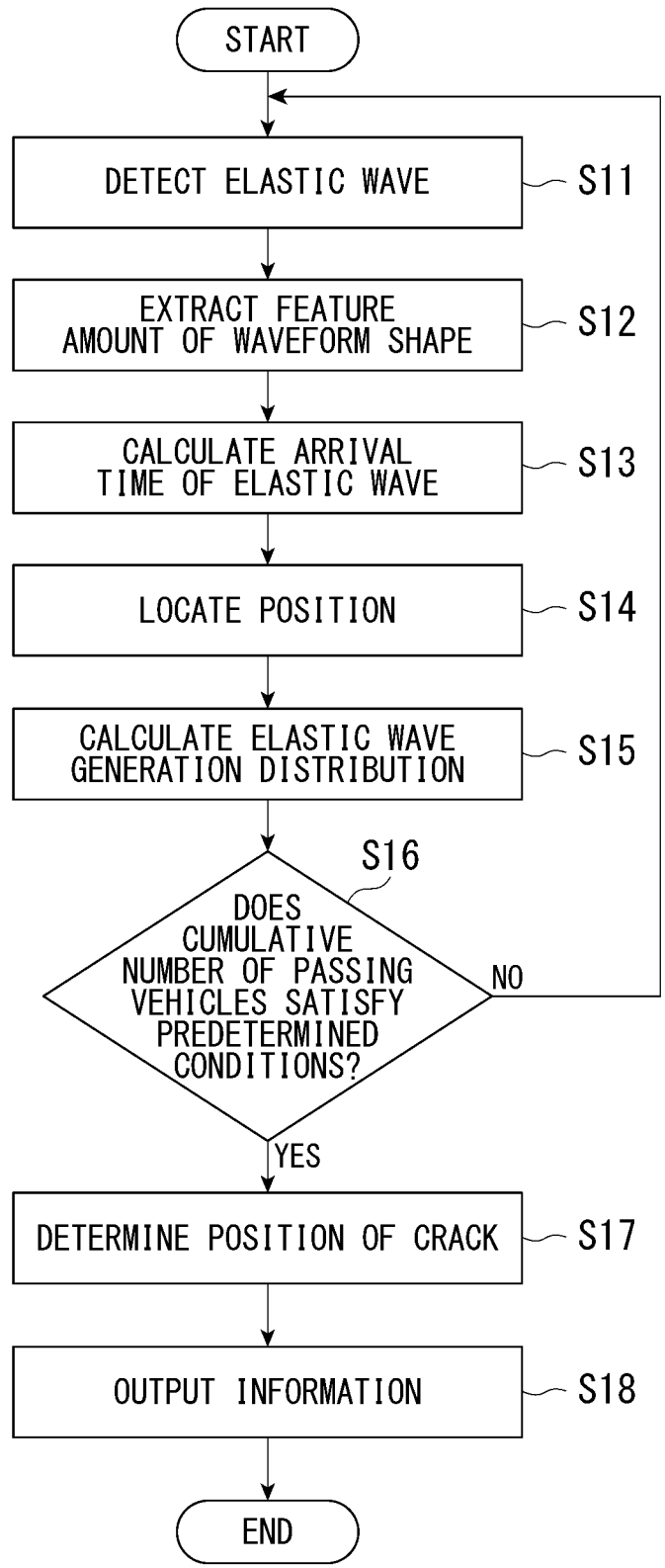
FIG. 15 is a flow chart illustrating a flow of processes of the detection system of the first embodiment.

FIG. 15 is a flow chart illustrating a flow of a detection method of the present embodiment.

As shown in FIG. 15, first, the detection system 1 detects an elastic wave associated with the generation of the crack C or the progress of the crack C using the AE sensors 111 and 121 provided in the bridge structure 10 (step S11).

Next, the detection system 1 extracts a feature amount featuring the waveform shape (a parameter featuring the waveform shape) of the elastic wave detected by each of the AE sensors 111 and 121 on the basis of the detection result of each of the AE sensors 111 and 121 (step S12). In addition, the detection system 2 calculates the arrival time of the elastic wave for each of the AE sensors 111 and 121 on the basis of the detection result of each of the AE sensors 111 and 121 (step S13). Meanwhile, steps S12 and S13 may be performed in a reverse order, or may be simultaneously performed.

Next, the detection system 1 locates the generation source position of the elastic wave (step S14). Specifically, the detection system 1 compares, for example, the similarities between the elastic waves detected by the AE sensors 111A and 111B on the basis of the information relating to the feature amount of the waveform shape of the elastic wave. In a case where the similarities between the elastic waves detected by the AE sensors 111A and 111B are in a predetermined range, these elastic waves are determined to be the same elastic wave, and the generation source position of the elastic wave is located. For example, the location of the generation source position of the elastic wave is performed on the basis of a time difference between times when the two AE sensors 111A and 111B detect the elastic waves, the propagation velocity of the elastic wave in the longitudinal rib 33, and the position of the welded portion 38.

Next, the detection system 1 accumulates the located generation source position of the elastic wave, and calculates the elastic wave generation distribution (step S15).

In addition, the detection system 1 monitors whether the cumulative number of passing vehicles that pass on the traveling surface TS satisfies the above-described predetermined conditions on the basis of the cumulative number of passing vehicles measured by the traffic volume measuring device 300 (step S16). In a case where the cumulative number of passing vehicles does not satisfy the predetermined conditions (step S16: NO), the processes of steps S11 to S15 are repeated.

On the other hand, in a case where the cumulative number of passing vehicles satisfies the predetermined conditions (step S16: YES), the detection system 1 determines the position of the crack C or the like on the basis of the calculated elastic wave generation distribution (S17). The detection system 1 causes the display device 510 to display information indicating the determined position of the crack C or the like (step S18). Thereby, processing of the flow shown in FIG. 15 is terminated.

According to the configuration described, it is possible to achieve an improvement in the accuracy of detection of the state of the bridge structure 10. Here, the elastic waves captured by the AE sensors 111 and 121 also include a large amount of unrelated noise in addition to things generated from the crack C. The elastic wave from the crack C applies a load to the steel plate deck 13 when the vehicle V passes on the traveling surface TS, whereby noise is generated by the progress of the crack C or already existing cracks C rubbing against each other. For this reason, in a case where a sufficient number of vehicles V do not pass on the inspection object region DP, the number of generations of the elastic wave which sufficiently exceeds noise is not observed, and thus it may be difficult to accurately detect the position of the crack C.

Consequently, in the present embodiment, a counting time required for detecting the crack C accurately and a time taken for a sufficient number of vehicles V to pass on the traveling surface TS are determined on the basis of the traffic volume at a corresponding point. Thereby, it is possible to determine the position of the crack C more accurately.

In addition, the traffic volume for determining a counting time is considered on the basis of the number of all passing vehicles V, the number of passing vehicles limited to a specific type such as a large-size vehicle, the number of passing vehicles according to a specific lane, or the like, but a shortest time among them has only to be set to a measurement time. Therefore, a shortest time among them is set to a counting time, whereby it is possible to achieve a reduction in inspection cost. In addition, even in a case where a counting time in which inspection can be performed actually is not sufficient, the inspection can also be utilized in the evaluation of the reliability a crack position detection result obtained in a short counting time.

Second Embodiment

Next, a second embodiment will be described. The second embodiment is different from the first embodiment, in that the position of the crack C is also determined on the basis of information indicating energy of an elastic wave in addition to the elastic wave generation distribution. Meanwhile, configurations other than those described below are the same as those of the first embodiment.

Figure 16:
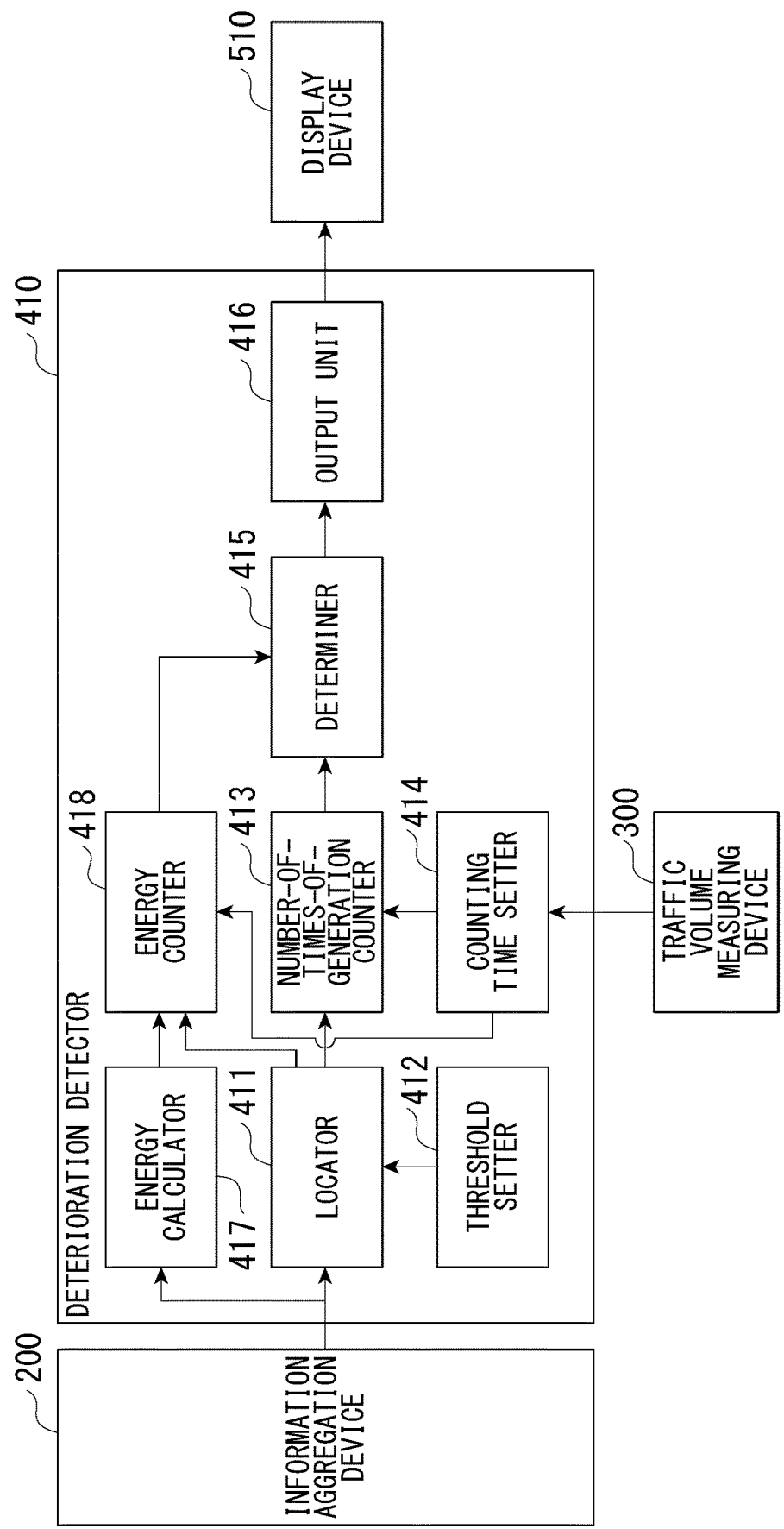
FIG. 16 is a block diagram illustrating a system configuration of a deterioration detector of a second embodiment.

FIG. 16 is a block diagram illustrating a system configuration of a deterioration detector 410 of the second embodiment. The deterioration detector 410 of the present embodiment further includes an energy calculator 417 and an energy counter 418 in addition to the configuration of the first embodiment.

The energy calculator 417 calculates the magnitude of energy of an elastic wave on the basis of outputs of the AE sensors 111 and 121. For example, the energy calculator 417 calculates the magnitude of energy of an elastic wave on the basis of at least one of the amplitude of the elastic wave (for example, the amplitude A in FIG. 10) and the time duration (for example, the time duration T2 in FIG. 10). The magnitude of energy of an elastic wave calculated by the energy calculator 417 is output to the energy counter 418.

The energy counter 418 accumulates information of the energy of an elastic wave calculated by the energy calculator 417 and information of the generation source position of an elastic wave located by the locator 411 over, for example, the predetermined counting time, to thereby calculate the cumulative energy distribution of a plurality of elastic waves generated within the predetermined counting time. More specifically, whenever an elastic wave is detected, the energy counter 418 integrates the energy of the elastic wave at the generation source position of the elastic wave located by the locator 411, to thereby calculate the cumulative energy distribution for each generation source position of the elastic wave. The energy counter 418 is an example of a "second counter."

Figure 17:
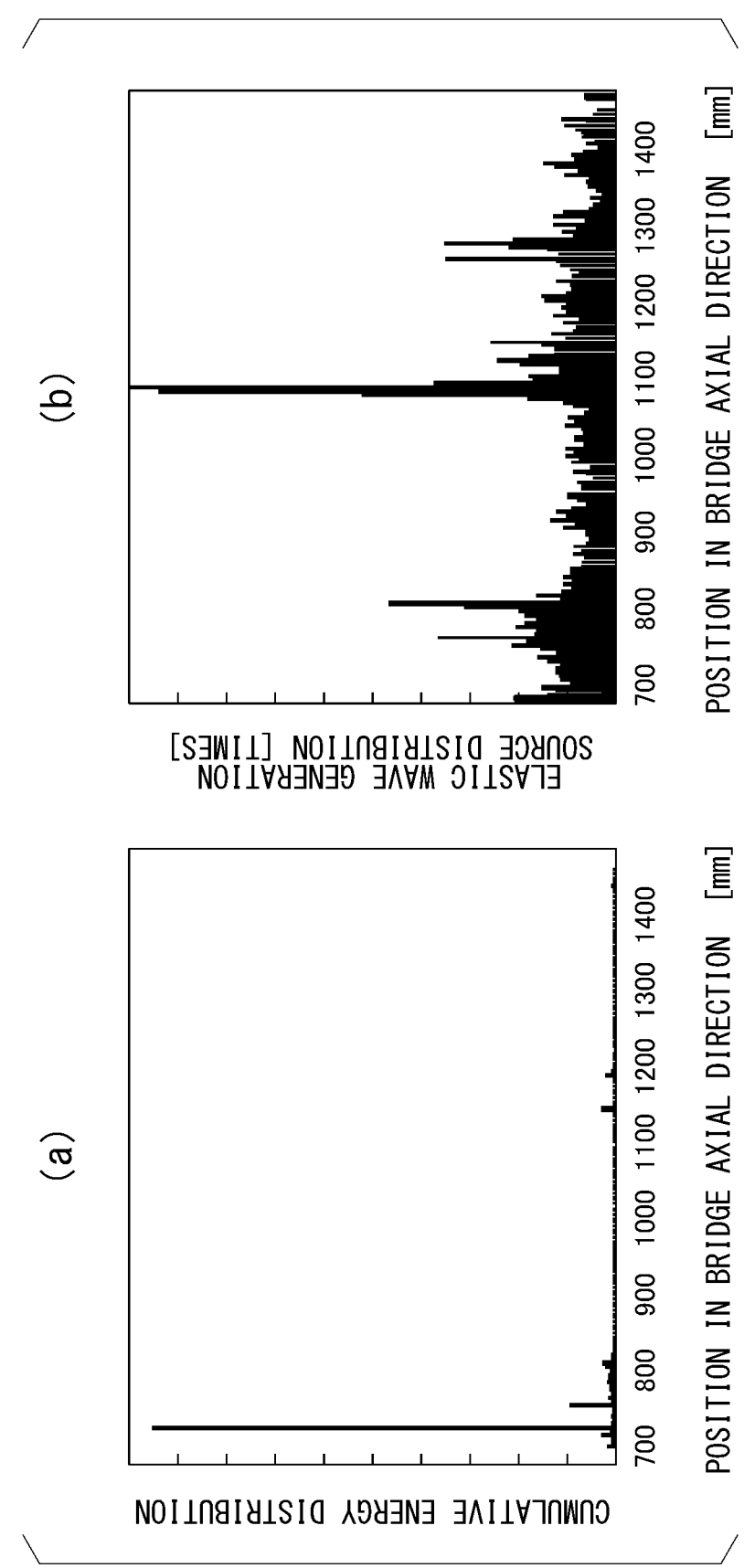
FIG. 17 is a diagram illustrating an example of the cumulative energy distribution of an elastic wave and elastic wave generation distribution of the second embodiment.

FIG. 17 is a diagram illustrating an example of the cumulative energy distribution of the elastic wave calculated by the energy counter 418 (part (a) of FIG. 17) and the elastic wave generation distribution calculated by the number-of-times-of-generation counter 413 (part (b) of FIG. 17). In the example shown in FIG. 17, it can be understood that the concentration of distribution is confirmed at different positions in the cumulative energy distribution of the elastic wave and the elastic wave generation distribution, and that the crack C which is not able to be grasped in either distribution is present.

In the present embodiment, the determiner 415 determines the position of the crack C on the basis of the elastic wave generation distribution calculated by the number-of-times-of-generation counter 413 and the cumulative energy distribution calculated by the energy counter 418. That is, the determiner 415 determines that the crack C is present at a position where the number of times of generation of an elastic wave is set to be equal to or greater than a threshold which is set in advance in the elastic wave generation distribution. In addition thereto, the determiner 415 determines that the crack C is present at a position where the cumulative energy of the elastic wave is set to be equal to or greater than the threshold which is set in advance in the cumulative energy distribution of the elastic wave.

According to such a configuration, it is possible to achieve a further improvement in the accuracy of detection of the state of the bridge structure 10. That is, it is confirmed by the inventors' experiment that the crack C in which an elastic wave having very large energy is generated at a rare frequency is also present depending on the property of the crack C. Such a crack C may not be detected in a determination alone based on the elastic wave generation distribution.

However, in the determiner 415 of the present embodiment, the determination of a crack position based on the cumulative energy distribution obtained by integrating the energy of the elastic wave for each generation source position of the elastic wave is concurrently used in addition to the elastic wave generation distribution calculated by the number-of-times-of-generation counter 413. Thereby, it is possible to grasp even the crack C which is not able to be grasped from the elastic wave generation distribution.

Third Embodiment

Next, a third embodiment will be described. The third embodiment is different from the first embodiment, in that the inspection object region DP is set so as not to straddle a splicing portion 60 provided in the longitudinal rib 33. Meanwhile, configurations other than those described below are the same as those of the first embodiment.

Figure 18:
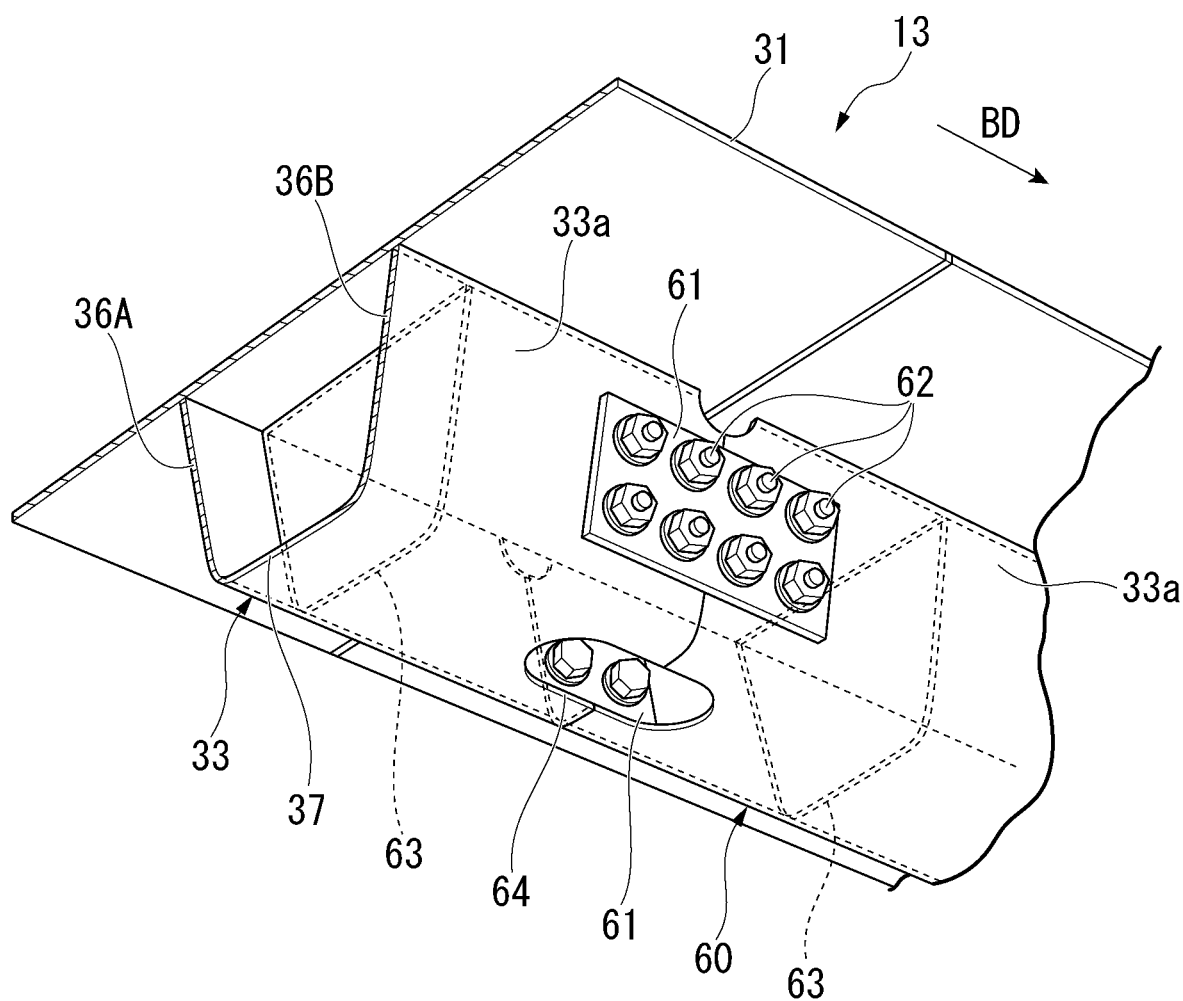
FIG. 18 is a cross-sectional perspective view illustrating an example of a steel plate deck of a third embodiment.

FIG. 18 is a cross-sectional perspective view illustrating an example of a steel plate deck 13 of the third embodiment. As shown in FIG. 18, the longitudinal rib 33 includes a plurality of longitudinal ribs member 33a formed dividedly in the bridge axial direction BD and a plurality of splice plates 61 for coupling the plurality of longitudinal ribs member 33a to each other. That is, the longitudinal ribs 33 are arranged over the total length of the steel plate deck 13 in the bridge axial direction, but are formed dividedly for every a dozen of m to tens of m, and coupled to each other by the splice plates 61. For example, the plurality of splice plates 61 are allocated to the inner surfaces and outer surfaces of the end portions of the plurality of longitudinal ribs member 33a, and are fixed to the longitudinal rib members 33a by fastening members 62 such as a bolt. Thereby, the end portions of the plurality of longitudinal ribs member 33a are coupled to each other by the splice plates 61.

When seen from another viewpoint, each of the longitudinal ribs 33 includes a plurality of extended portions 70 extending in the bridge axial direction BD and the splicing portion 60, provided between the plurality of extended portions 70, which couples the plurality of extended portions 70 to each other. The splicing portion 60 is a field joint of the longitudinal rib 33, and includes the aforementioned splice plates 61. To express the above configuration in other words, the longitudinal rib 33 is divided into a plurality of sections R (see FIG. 19) in the bridge axial direction BD by one or more splicing portions 60. That is, the longitudinal rib 33 is divided into the plurality of sections R using each of one or more splicing portions 60 as a boundary.

For example, the plate thickness of the splicing portion 60 is larger than the plate thickness of the extended portion 70. For example, the plate thickness of the splicing portion 60 is 8 mm, and the plate thickness of the extended portion 70 is 6 mm. In addition, the splicing portion 60 includes diaphragms 63 provided inside the longitudinal rib 33. The diaphragm 63 is a member for hermetically sealing the inside of the longitudinal rib 33. The lower portion of the splicing portion 60 is provided with a hand hole 64 for a worker to put his hand into the inside of the longitudinal rib 33.

Figure 19:
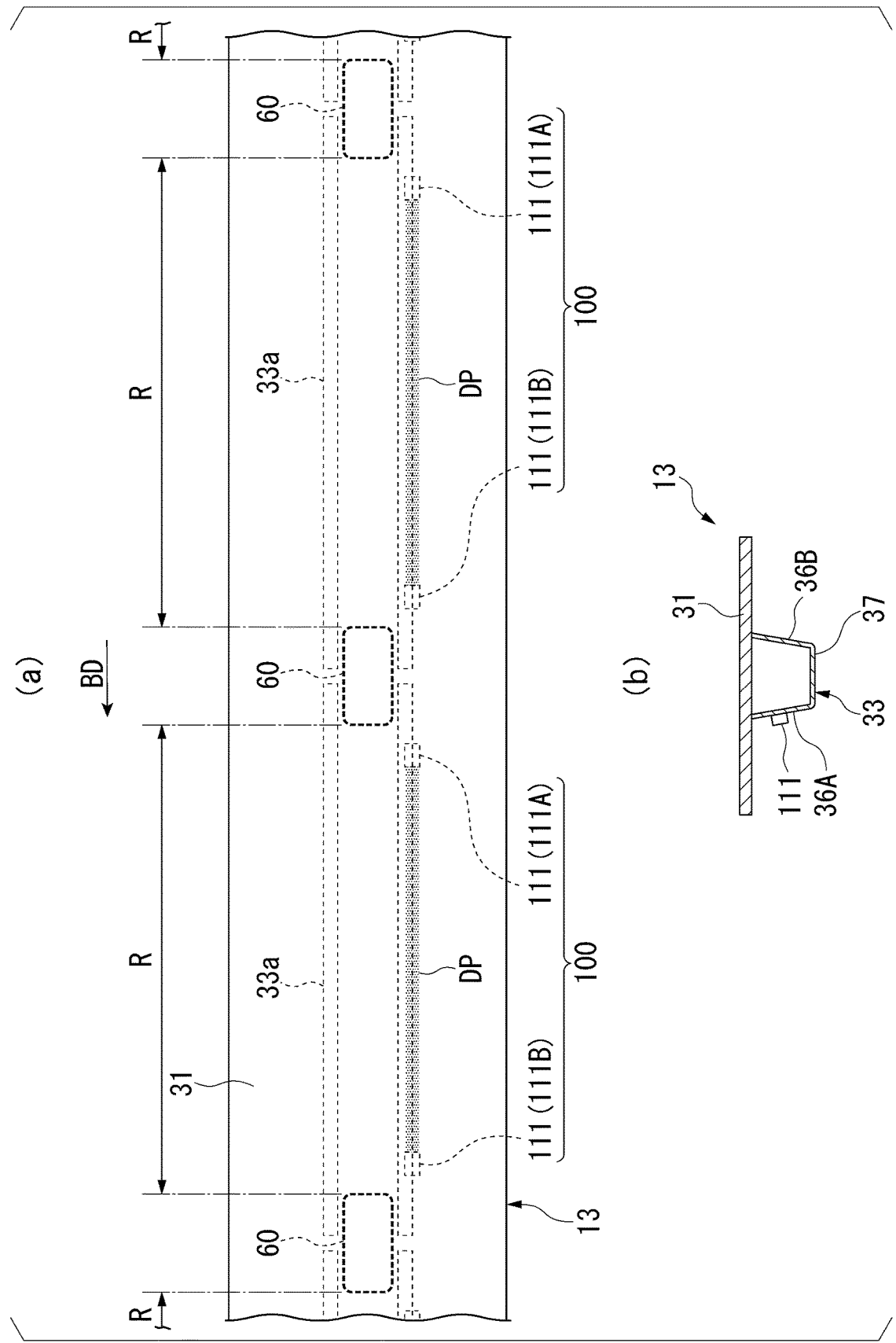
FIG. 19 is a plan view illustrating the arrangement positions of AE sensors of the third embodiment.

FIG. 19 is a plan view illustrating the arrangement positions of the AE sensors 111 of the present embodiment. In the present embodiment, the inspection object region DP is independently set for each section R so as not to be divided to both sides of each splicing portion 60 included in one or more splicing portions 60 provided in the longitudinal rib 33 in the bridge axial direction BD (so as not to straddle the splicing portion 60). That is, the plurality of AE sensors 111 (for example, a pair of first and second AE sensors 111A and 111B) intended for the same inspection object region DP are installed on the longitudinal rib 33 within one section R so as not to be divided to both sides of the splicing portion 60 in the bridge axial direction BD, and detect elastic waves generated from the section R.

Figure 20:
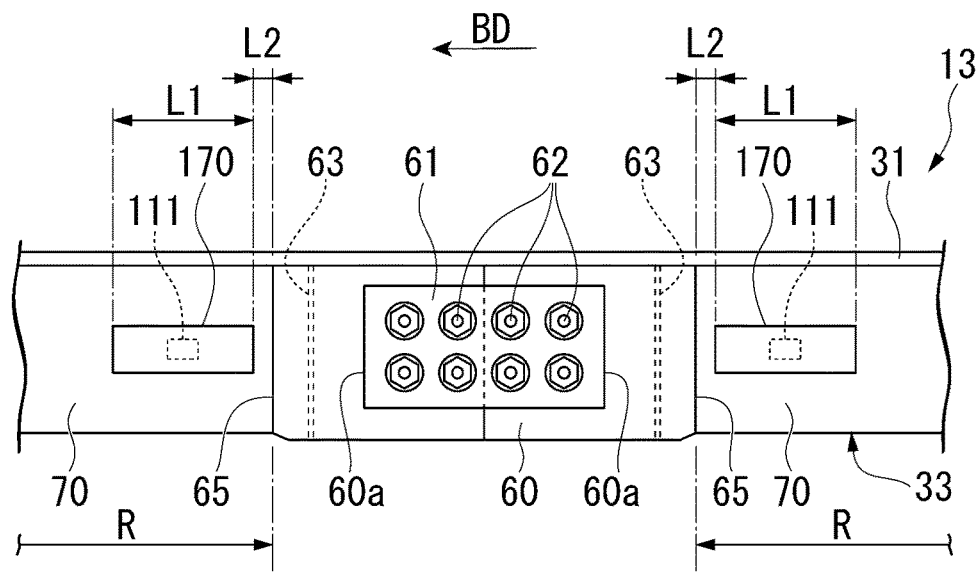
FIG. 20 is a side view illustrating the arrangement positions of the AE sensors of the third embodiment.

FIG. 20 is a side view illustrating the arrangement positions of the AE sensors 111 of the present embodiment.

The AE sensor 111 is disposed at a position as close to the splicing portion 60 as possible. For example, the AE sensor 111 is disposed so that a distance from a specific region of a splicing portion 60 is set to be within a predetermined distance (for example, 15 cm) with respect to a splicing portion 60 closest to this AE sensor 111. An example of the "specific region" is a terminal 60a (a first specific region) on a side close to the AE sensor 111 in the bridge axial direction BD among the splice plates 61. Another example of the "specific region" may be a diaphragm 63 closest to the AE sensor 111 (a second specific region) among a plurality of diaphragms 63 provided in the splicing portion 60. Still another example of the "specific region" may be a terminal 65 on a side close to the AE sensor 111 in a region having an increase in the plate thickness of the longitudinal rib 33 (a third specific region). The "specific region" may be a position located outermost of the splicing portion 60 in the bridge axial direction BD among the first specific region, the second specific region, and the third specific region described above.

Here, a fixation structure of the AE sensor 111 will be described.

Figure 21:
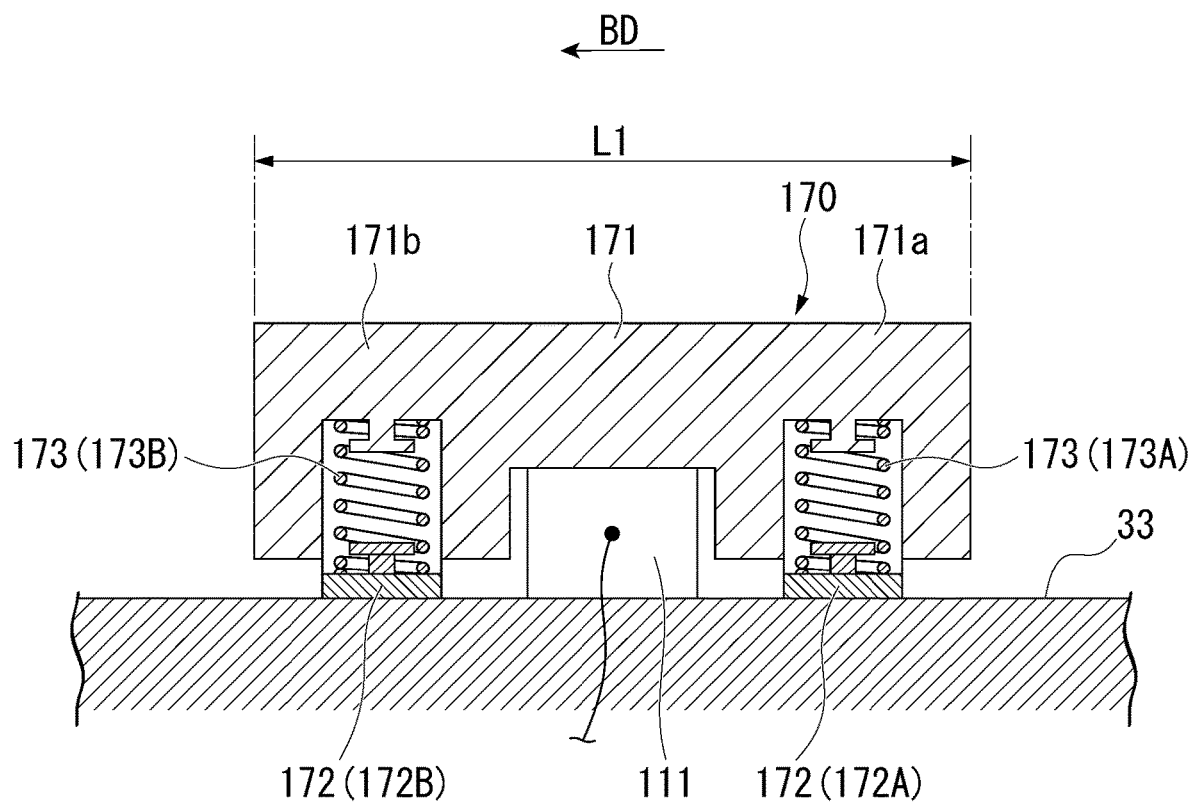
FIG. 21 is a cross-sectional view illustrating a holder for fixing the AE sensor of the third embodiment.

FIG. 21 is a cross-sectional view illustrating a holder 170 for fixing the AE sensor 111 to the longitudinal rib 33. The holder 170 includes, for example, a holder main body 171, a plurality of magnets 172, and a plurality of spring members 173.

The holder main body 171 is brought into contact with the AE sensor 111 from the opposite side of the longitudinal rib 33. The holder main body 171 has a width (length) L1 larger than the AE sensor 111 in the bridge axial direction BD. For example, the holder main body 171 includes a first portion 171a located on a first side in the bridge axial direction BD with respect to the AE sensor 111 and a second portion 171b located on the opposite side of the first side.

The plurality of magnets 172 includes a first magnet 172A and a second magnet 172B. The first magnet 172A is provided corresponding to the first portion 171a of the holder main body 171. The second magnet 172B is provided corresponding to the second portion 171b of the holder main body 171. The first and second magnets 172A and 172B are adsorbed by a magnetic force with respect to the longitudinal rib 33, and are detachably fixed to the longitudinal rib 33.

The plurality of spring members 173 includes a first spring member 173A and a second spring member 173B. The first spring member 173A is fixed to the first portion 171a and the first magnet 172A of the holder main body 171, and biases the first portion 171a of the holder main body 171 toward the first magnet 172A. The second spring member 173B is fixed to the second portion 171b and the second magnet 172B of the holder main body 171, and biases the second portion 171b of the holder main body 171 toward the second magnet 172B.

Here, a distance L2 between the holder 170 and a specific region (that is, the first specific region, the second specific region, or the third specific region) of the splicing portion 60 in the bridge axial direction BD is smaller than the total length L1 of the holder 170 in the bridge axial direction BD. For example, a distance in the bridge axial direction BD between the holder 170 and the specific region located outermost of the splicing portion 60 in the bridge axial direction BD among the first specific region, the second specific region, and the third specific region is smaller than the total length L1 of the holder 170 in the bridge axial direction BD.

According to such a configuration, it is possible to achieve a further improvement in the accuracy of detection of the state of the bridge structure 10. That is, the elastic wave propagates without being attenuated very far away (for example, over a distance of 10 m or more) in the bridge axial direction BD within the longitudinal rib 33 in the case of not being discontinuous as in the splicing portion 60. Therefore, an interval between the AE sensors 111 installed on the longitudinal rib 33 can be set to approximately 10 m. This is preferable from the object of inspecting cracks of the welded portion in a wider range in a small number of AE sensors 111.

Here, thus far, since the longitudinal ribs 33 are strongly coupled to each other through the splice plate 61, for example, in the splicing portion 60, it has been considered that the elastic wave is transmitted beyond the splicing portion 60 without being attenuated greatly. Even in a case where propagation through the splicing portion 60 is attenuated, it is also considered that the elastic wave is transmitted bypassing the splicing portion 60 through the deck plate 31. However, it has been first confirmed by the inventors' experiment that the elastic wave is very greatly attenuated in reality in the splicing portion 60 of the longitudinal rib 33, and that the elastic wave is not almost transmitted beyond the splicing portion 60. Those skilled in the art having new knowledge relevant to such a elastic wave will appreciate that an inspection section is delimited for each bridge pier from convenience of inspection work.

Some reasons for attenuation in the splicing portion 60 being great are as follows: (1) the extension of the longitudinal rib 33 in the bridge axial direction BD is cut off in the splicing portion 60; (2) an elastic wave is reflected in a portion having an increase in the plate thickness of the splicing portion 60; (3) in a portion to which the splice plate 61 is fixed by the fastening member 62, the effective plate thickness changes, and an elastic wave is reflected; (4) an elastic wave propagated in the bridge axial direction BD by the diaphragm 63 of the splicing portion 60 is diffused in an orthogonal direction; (5) an elastic wave propagated through the deck plate 31 bypassing the splicing portion 60 of the longitudinal rib 33 is not likely to be transmitted due to the elastic wave being absorbed by asphalt of the pavement portion 32 and being attenuated greatly, and the like.

In a case where the splicing portion 60 is present between the two AE sensors 111, the elastic wave is attenuated without reaching one AE sensor, and thus the generation source position of the elastic wave is not able to be located. For this reason, in the present embodiment, the inspection object region DP is disposed so as not to straddle the splicing portion 60.

On the other hand, in a case where a distance between the splicing portion 60 and the AE sensor 111 is unnecessarily large, it is not possible to detect the crack C in the vicinity of the splicing portion 60. In the present embodiment, in order to reduce such a dead zone (a region in which the crack C is not able to be detected), the AE sensor 111 is disposed as close to the splicing portion 60 as possible (for example, in a range of 15 cm).

In the present embodiment, the detection device 100 is installed one by one with respect to each of the plurality of sections R which are cut off by the splicing portion 60. According to such a configuration, it is possible to perform inspection over the total length of the bridge structure 10 such as a bridge efficiently in the smallest number of sensors.

Fourth Embodiment

Next, a fourth embodiment will be described. The fourth embodiment is different from the third embodiment, in that the AE sensor 121 is installed on the deck plate 31 near the splicing portion 60. Meanwhile, configurations other than those described below are the same as those of the third embodiment.

Figure 22:
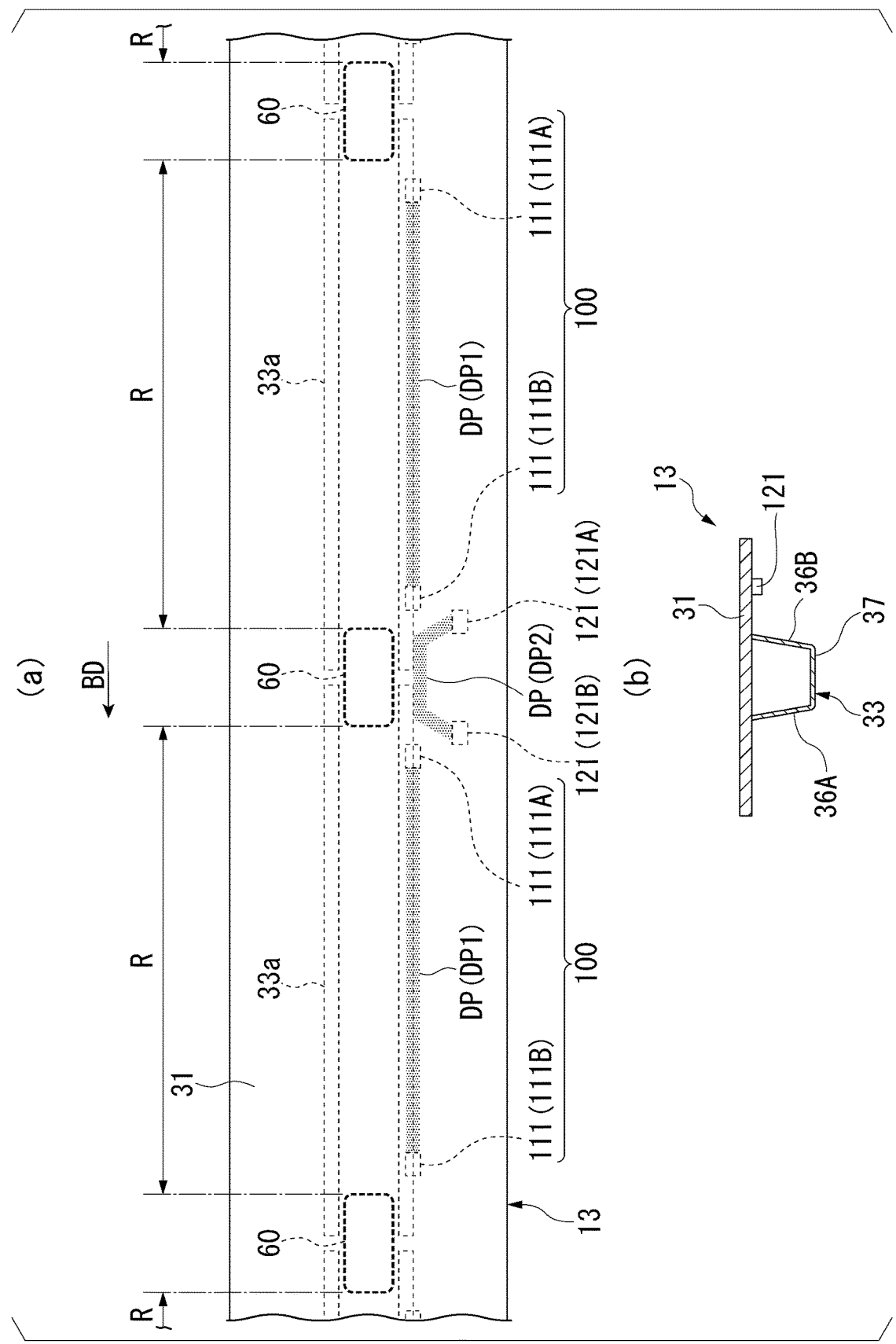
FIG. 22 is a plan view illustrating the arrangement positions of the AE sensors of a fourth embodiment.

FIG. 22 is a plan view illustrating the arrangement positions of the AE sensors 111 and 121 of the present embodiment. In the present embodiment, similarly to the third embodiment, a first inspection object region DP1 realized by the plurality of AE sensors 111 (for example, a pair of first and second AE sensors 111A and 111B) provided on the longitudinal rib 33 is independently set for each section R so as not to be divided to both sides of each splicing portion 60 included in one or more splicing portions 60 provided in the longitudinal rib 33 in the bridge axial direction BD (so as not to straddle the splicing portion 60).

On the other hand, a second inspection object region DP2 realized by the plurality of AE sensors 121 (for example, a pair of third and fourth AE sensors 121A and 121B) provided on the deck plate 31 is set to extend over both sides of the splicing portion 60 in the bridge axial direction BD. That is, the plurality of AE sensors 121 (for example, a pair of third and fourth AE sensors 121A and 121B) intended for the second inspection object region DP2 are installed on the deck plate 31 so as to be divided to both sides of the splicing portion 60 in the bridge axial direction BD, and detect elastic waves which are generated near the splicing portion 60.

Here, within the deck plate 31, the elastic wave may not reach a distant point due to the elastic wave being absorbed and attenuated by asphalt of the pavement portion 32. For this reason, a distance between the plurality of AE sensors 121 installed on the deck plate 31 is required to be reduced (for example, to be set to be equal to or less than 1 m). For example, the plurality of AE sensors 121 are installed at positions within 1 m from the above-described specific region (any of the first to third specific regions) of the splicing portion 60 to the outside. The definition of the specific region of the splicing portion 60 is the same as the definition in the third embodiment.

The locator 411 locates the generation source position of the elastic wave in the first inspection object region DP1 on the basis of outputs of the first AE sensor 111A and the second AE sensor 111B. In addition, the locator 411 locates the generation source position of the elastic wave in the second inspection object region DP2 on the basis of outputs of the third AE sensor 121A and the fourth AE sensor 121B.

According to such a configuration, it is possible to detect the crack C generated in the splicing portion 60 or the crack C generated near the splicing portion 60.

(Modification Example of Fourth Embodiment)

Next, a modification example of the fourth embodiment will be described. The present modification example is different from the fourth embodiment in the installation position of the AE sensor 121. Meanwhile, configurations other than those described below are the same as those of the fourth embodiment.

Figure 23:
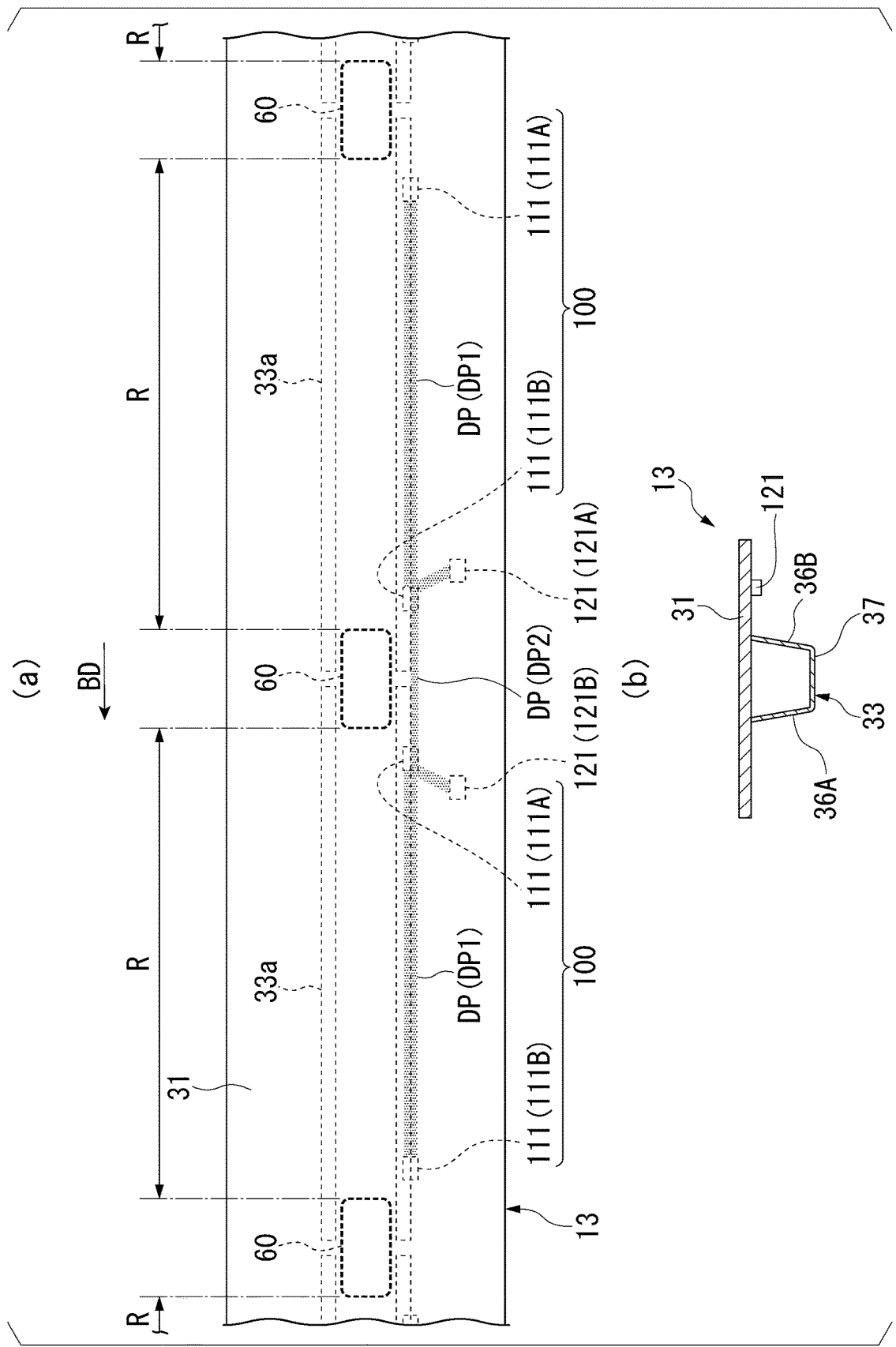
FIG. 23 is a plan view illustrating the arrangement positions of the AE sensors of a modification example of the fourth embodiment.

FIG. 23 is a plan view illustrating the arrangement positions of the AE sensors 111 and 121 of the present modification example. In the present modification example, the plurality of AE sensors 121 provided on the deck plate 31 are disposed at positions further away from the splicing portion 60 than the AE sensors 111 provided on the longitudinal rib 33 in the bridge axial direction BD. Thereby, the first inspection object region DP1 of the AE sensors 111 (for example, a pair of first and second AE sensors 111A and 111B) provided on the longitudinal rib 33 and the second inspection object region DP2 of the AE sensors 121 (for example, a pair of third and fourth AE sensors 121A and 121B) provided on the deck plate 31 partially overlap each other.

According to such a configuration, it is possible to eliminate a dead zone.

Fifth Embodiment

Next, a fifth embodiment will be described. The fifth embodiment is different from the third embodiment, in that the longitudinal rib 33 is divided into a plurality of sections R by the cross beam 22. Meanwhile, configurations other than those described below are the same as those of the third embodiment.

Figure 24:
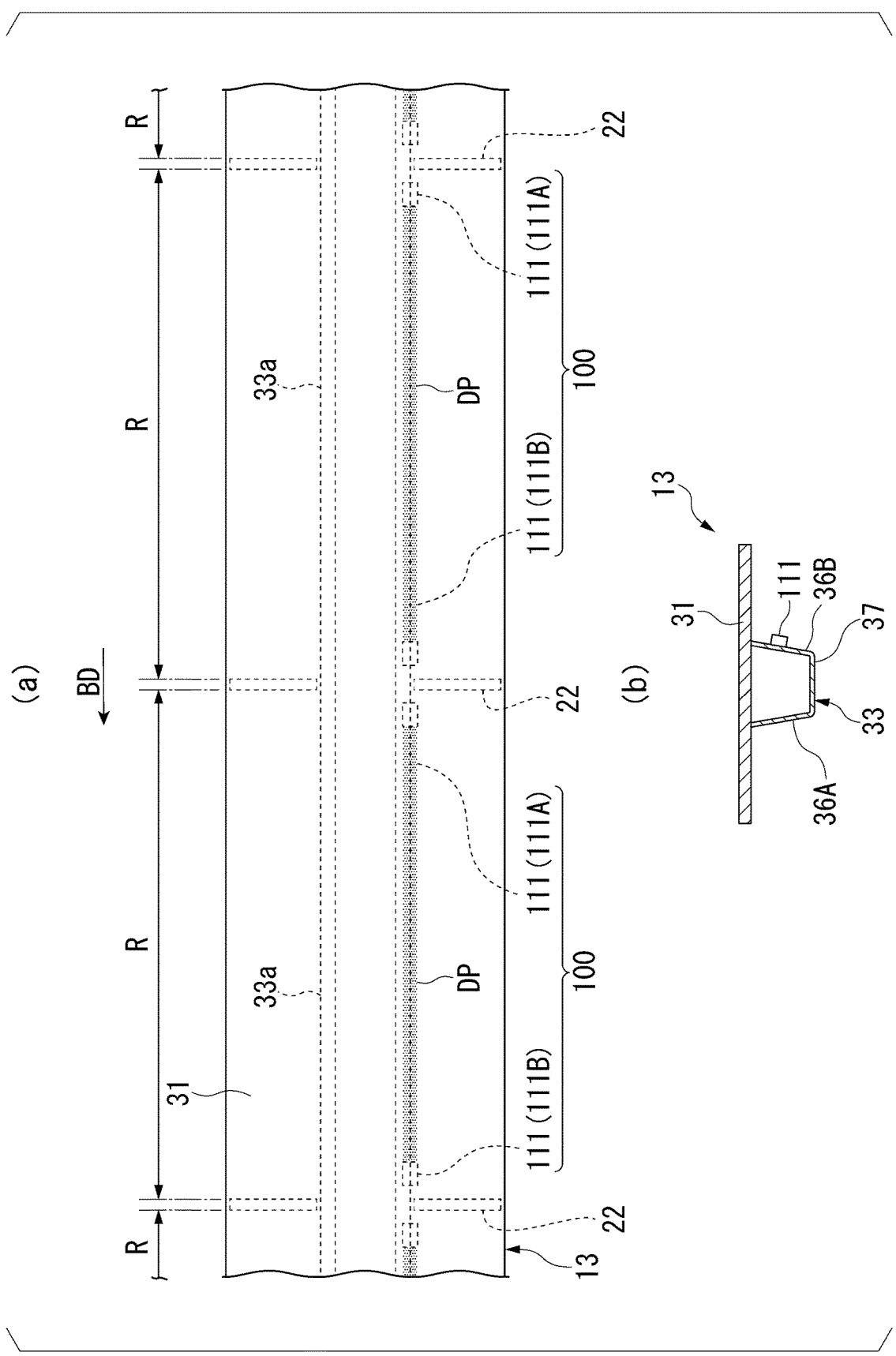
FIG. 24 is a plan view illustrating the arrangement positions of the AE sensors of a fifth embodiment.

FIG. 24 is a plan view illustrating the arrangement positions of the AE sensors 111 of the present embodiment. As shown in FIG. 24, the longitudinal rib 33 is divided into the plurality of sections R in the bridge axial direction BD by one or more splicing portions 60 and one or more cross beams 22.

In the present embodiment, the inspection object region DP is set within each section R so as not to be divided to both sides of the cross beam 22 in the bridge axial direction BD (so as not to straddle the cross beam 22). That is, the plurality of AE sensors 111 (for example, a pair of first and second AE sensors 111A and 111B) intended for the same inspection object region DP are installed on the longitudinal rib 33 within one section R so as not to be divided to both sides of the cross beam 22 in the bridge axial direction BD, and detect elastic waves generated from the section R. Each of the two AE sensors 111A and 111B is disposed at a position as close to the cross beam 22 as possible. For example, the AE sensor 111 is disposed so that a distance from the cross beam 22 is set to be within a predetermined distance (for example, 15 cm).

According to such a configuration, it is possible to achieve a further improvement in the accuracy of detection of the state of the bridge structure 10. That is, even in the cross beam 22 of which the plate thickness is larger than the longitudinal rib 33, and which is welded in a direction intersecting the longitudinal rib 33, an elastic wave propagated in the bridge axial direction BD is diffused and is attenuated greatly. Therefore, in the present embodiment, the inspection object region DP is disposed so as not to straddle the cross beam 22.

Sixth Embodiment

Next, a sixth embodiment will be described. The sixth embodiment is different from the first embodiment, in that the AE sensor 111 is installed at a distance from the end portion of the inspection object region DP, and a plurality of inspection object regions DP1 and DP2 are set to partially overlap each other. Meanwhile, configurations other than those described below are the same as those of the first embodiment. Hereinafter, as an example of the AE sensor disposed at a distance from the end portion of the inspection object region DP, a case where the AE sensor 111 provided on the longitudinal rib 33 is appropriate will be described. Meanwhile, the AE sensor disposed at a distance from the end portion of the inspection object region DP may be the AE sensor 121 provided on the deck plate 31.

Figure 25:
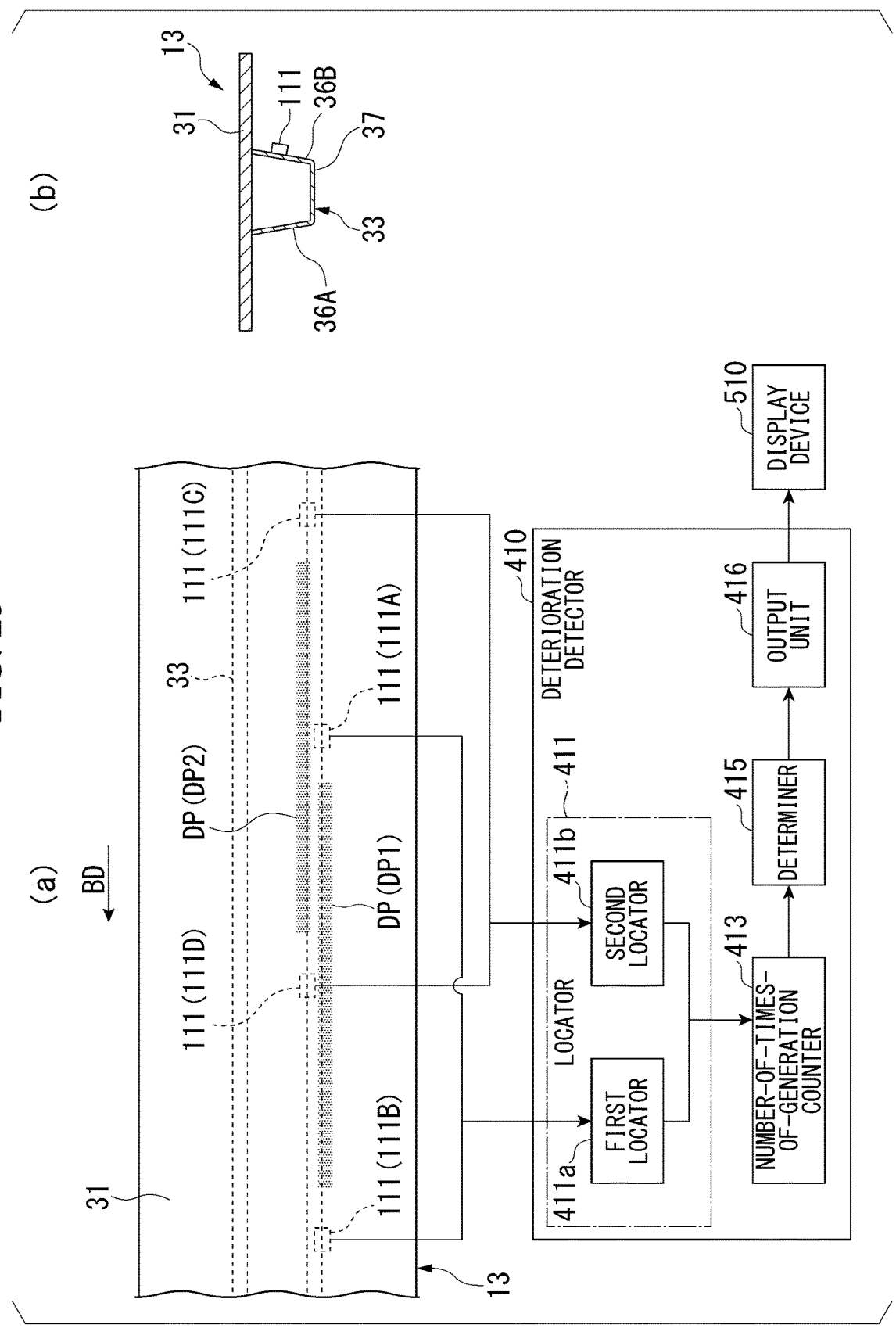
FIG. 25 is a diagram illustrating the arrangement positions of the AE sensors of a sixth embodiment.

FIG. 25 is a diagram illustrating the arrangement positions of the AE sensors 111 of the present embodiment. In the present embodiment, the first inspection object region DP1 and the second inspection object region DP2 are set in the bridge structure 10.

The plurality of AE sensors 111 (for example, a pair of first and second AE sensors 111A and 111B) are provided corresponding to the first inspection object region DP1. That is, the locator 411 includes a first locator 411a that locates the generation source position of the elastic wave in the first inspection object region DP1 on the basis of outputs of the first and second AE sensors 111A and 111B. In the present embodiment, the first and second AE sensors 111A and 111B are disposed at positions away from both ends of the first inspection object region DP1 toward the outside by a predetermined distance or more in the bridge axial direction BD, and are installed on the longitudinal rib 33. The "predetermined distance" is, for example, 15 cm or more.

The plurality of AE sensors 111 (for example, a third AE sensor 111C and a fourth AE sensor 111D) are provided corresponding to the second inspection object region DP2. That is, the locator 411 includes a second locator 411b that locates the generation source position of the elastic wave in the second inspection object region DP2 on the basis of outputs of the third AE sensor 111C and the fourth AE sensor 111D. The third AE sensor 111C and the fourth AE sensor 111D are disposed at positions away from both ends of the second inspection object region DP2 toward the outside by a predetermined distance or more in the bridge axial direction BD, and are installed on the longitudinal rib 33. The "predetermined distance" is, for example, 15 cm or more.

In the present embodiment, the first inspection object region DP1 and the second inspection object region DP2 are set to partially overlap each other.

According to such a configuration, it is possible to achieve a further improvement in the accuracy of detection of the state of the bridge structure 10. Here, an example of the measurement result of the generation source distribution of the elastic wave will be described with reference to FIG. 12. Both right and left ends in FIG. 12 are the positions of the AE sensor 111A and the AE sensor 111B, respectively. In this case, as in the left end of the example of FIG. 12, a high-density elastic wave generation distribution may be calculated in the vicinity of the position of the AE sensor 111. This reason is because, in a case where an elastic wave generated from outside of two AE sensors 111 is detected by the two AE sensors 111, all arrival time differences at the two AE sensors 111 become constant in spite of the generation source position being originally able to be located, and the generation source position of the elastic wave is located in the vicinity of the AE sensor 111. Therefore, even when the crack C is not present in the vicinity of the AE sensor 111, there is a tendency for the elastic wave generation distribution to be concentrated in the vicinity of the AE sensor 111 due to a noise elastic wave. In a case where the position of a high-density elastic wave generation distribution is determined to be the position of the crack C, there is the possibility of the position of the crack C being detected incorrectly in the vicinity of the AE sensor 111.

Consequently, in the present embodiment, the first and second AE sensors 111A and 111B are disposed at positions away from both ends of the first inspection object region DP1 toward the outside by a predetermined distance or more in the bridge axial direction BD. In the present embodiment, the elastic wave distribution in the vicinity (for example, within 15 cm) of the AE sensors 111A and 111B is not calculated. Thereby, it is possible to suppress false detection of the generation source position of the elastic wave, and to achieve a further improvement in the accuracy of detection of the state of the bridge structure 10.

On the other hand, when the first and second AE sensors 111A and 111B are disposed at positions away from both ends of the first inspection object region DP1 toward the outside by a predetermined distance or more in the bridge axial direction BD, a dead zone in which the crack C is not able to be detected occurs on both ends in a section between the AE sensors 111A and 111B.

Consequently, in the present embodiment, two sets of detection devices 100 (a pair of first and second AE sensors 111A and 111B and a pair of third and fourth AE sensors 111C and 111D) are installed, and a mutual sensor pair is alternately disposed, whereby some of the mutual inspection object regions DP1 and DP2 overlap each other. This makes it possible for an inspection-disabled region not to be generated by making dead zones of two sets of detection devices 100 complement each other.

Hereinbefore, several embodiments have been described, but the embodiments are not limited to the above examples. For example, the embodiments and the modification example described above can be carried out in combination thereof. In addition, the detection device, the detection system, the detection method, and the information processing device are not limited to detecting the position of a crack, and may detect the state of a structure (for example, at least one of the presence or absence of deterioration, the degree of deterioration, the presence or absence of a crack, the position of a crack, the degree of a crack, and the like).

The detection device 100 is not required to include both the first AE sensor group 110 and the second AE sensor group 120, and may include only one of the first AE sensor group 110 and the second AE sensor group 120.

According to one viewpoint, in the third to sixth embodiments, a predetermined measurement time used for the number-of-times-of-generation counter 413 to calculate the elastic wave generation distribution may be determined on the basis of another criterion without being based on the number of vehicles V traveling on the traveling surface TS.

According to at least one embodiment described above, the detection system is a detection system that detects a position of a crack present in a structure constituted by a first member for supporting a traveling surface on which a vehicle travels from below, a second member provided on an opposite side of the traveling surface with respect to the first member, and a welded portion which is provided along a boundary between the first member and the second member and in which the first member and the second member are fixed to each other. The detection system includes a plurality of AE sensors, a locator, a number-of-times-of-generation counter, and a determiner. The plurality of AE sensors detect an elastic wave, the sensors being disposed separately from each other in a direction in which the welded portion extends and each being installed on the first member or the second member. The locator locates a generation source position of an elastic wave on the basis of outputs of the plurality of AE sensors. The number-of-times-of-generation counter accumulates information of generation source positions of a plurality of elastic waves located by the locator to calculate a distribution of generation source positions of the plurality of elastic waves over a predetermined time. The determiner determines the position of the crack on the basis of the distribution calculated by the number-of-times-of-generation counter. The predetermined time is a time which is determined on the basis of a traffic volume of vehicles passing on the traveling surface. According to such a configuration, it is possible to achieve an improvement in the accuracy of detection of the state of a structure.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A detection system that detects a position of a crack present in a structure including a first member for supporting a traveling surface on which a vehicle travels from below, a second member provided on an opposite side of the traveling surface with respect to the first member, and a welded portion provided along a boundary between the first member and the second member, the detection system comprising:
   a plurality of sensors that detect an elastic wave, the sensors being disposed separately from each other in a direction in which the welded portion extends and each being installed on the first member or the second member;
   a locator that locates a generation source position of the elastic wave on the basis of outputs of the plurality of sensors;
   a first counter that accumulates information of generation source positions of a plurality of elastic waves located by the locator to calculate a distribution of generation source positions of the plurality of elastic waves over a predetermined time; and
   a determiner that determines the position of the crack on the basis of the distribution calculated by the first counter,
   wherein the predetermined time is a time which is determined on the basis of a traffic volume of vehicles passing on the traveling surface.

2. The detection system according to claim 1, wherein the predetermined time is a time in which the number of vehicles passing on the traveling surface exceeds a first number of passing vehicles.

3. The detection system according to claim 2, wherein the vehicles are vehicles of all types, and
   the first number of passing vehicles is 16,000.

4. The detection system according to claim 1, wherein the predetermined time is a time in which the number of vehicles of a specific type passing on the traveling surface exceeds a second number of passing vehicles.

5. The detection system according to claim 4, wherein the specific type is a large-size vehicle, and
   the second number of passing vehicles is 7,000.

6. The detection system according to claim 1, wherein the predetermined time is the shorter of a first time in which the number of vehicles of all types passing on the traveling surface exceeds a first number of passing vehicles and a second time in which the number of vehicles of a specific type passing on the traveling surface exceeds a second number of passing vehicles smaller than the first number of passing vehicles.

7. The detection system according to claim 1, wherein the predetermined time is a time the number of vehicles passing through a lane located directly on the welded portion on the traveling surface exceeds a third number of passing vehicles.

8. The detection system according to claim 7, wherein the vehicles passing through the lane are vehicles of all types, and
   the third number of passing vehicles is 5,300.

9. The detection system according to claim 1, wherein the predetermined time is the shortest of a first time in which the number of vehicles of all types passing on the traveling surface exceeds a first number of passing vehicles, a second time in which the number of vehicles of a specific type passing on the traveling surface exceeds a second number of passing vehicles smaller than the first number of passing vehicles, and a third time in which the number of vehicles passing through a lane located directly on the welded portion on the traveling surface exceeds a third number of passing vehicles smaller than the first number of passing vehicles.

10. The detection system according to claim 1, further comprising:
    an energy calculator that calculates energy of the elastic wave on the basis of the outputs of the plurality of sensors; and
    a second counter that calculates a cumulative energy distribution of a plurality of elastic waves by accumulating information of the energy of the elastic wave calculated by the energy calculator and information of the generation source position of the elastic wave located by the locator,
    wherein the determiner determines the position of the crack on the basis of the distribution calculated by the first counter and the cumulative energy distribution calculated by the second counter.

11. A method of detecting a position of a crack present in a structure including a first member for supporting a traveling surface on which a vehicle travels from below, a second member provided on an opposite side of the traveling surface with respect to the first member, and a welded portion provided along a boundary between the first member and the second member, the method comprising:
    locating a generation source position of an elastic wave on the basis of outputs of a plurality of sensors that detect the elastic wave, the sensors being disposed separately from each other in a direction in which the welded portion extends and each being installed on the first member or the second member;
    accumulating information of located generation source positions of a plurality of elastic waves to calculate a distribution of generation source positions of the plurality of elastic waves over a predetermined time; and
    determining the position of the crack on the basis of the calculated distribution,
    wherein the predetermined time is a time which is determined on the basis of a traffic volume of vehicles passing on the traveling surface.

12. An information processing device that detects a position of a crack present in a structure including a first member for supporting a traveling surface on which a vehicle travels from below, a second member provided on an opposite side of the traveling surface with respect to the first member, and a welded portion provided along a boundary between the first member and the second member, the information processing device comprising:
- a locator that locates a generation source position of an elastic wave on the basis of outputs of a plurality of sensors that detect the elastic wave, the sensors being disposed separately from each other in a direction in which the welded portion extends and each being installed on the first member or the second member;
- a counter that accumulates information of generation source positions of a plurality of elastic waves located by the locator to calculate a distribution of generation source positions of the plurality of elastic waves over a predetermined time; and
- a determiner that determines the position of the crack on the basis of the distribution calculated by the counter,
- wherein the predetermined time is a time which is determined on the basis of a traffic volume of vehicles passing on the traveling surface.

13. A detection device which is installed on a steel plate deck including a deck plate and a longitudinal rib fixed to the deck plate by a welded portion,
the longitudinal rib including one or more splicing portions, and the longitudinal rib being divided into a plurality of sections in a bridge axial direction with the one or more splicing portions as boundaries,
the detection device comprising:
- a plurality of sensors that detect an elastic wave, the sensors being installed on the longitudinal rib within one of a plurality of sections of the longitudinal rib divided by the one or more splicing portions provided in the longitudinal rib so as not to be divided to both sides of each splicing portion included in the one or more splicing portions in the bridge axial direction; and
- an output unit that outputs information obtained from the plurality of sensors to the outside.

14. The detection device according to claim 13, further comprising a holder that fixes each of the plurality of sensors to the longitudinal rib,
wherein a distance in the bridge axial direction between the holder and a specific region of a splicing portion closest to the holder among the one or more splicing portions is smaller than a total length of the holder in the bridge axial direction.

15. The detection device according to claim 13, wherein a structure including the steel plate deck includes one or more cross beams which are provided along a direction intersecting the bridge axial direction and are welded with the deck plate and the longitudinal rib, and which has a larger plate thickness than the longitudinal rib,
the longitudinal rib is divided into a plurality of sections in the bridge axial direction by the one or more splicing portions and the one or more cross beams, and
the plurality of sensors are installed on the longitudinal rib within one of the plurality of sections divided by the splicing portion and the cross beam.

16. A detection system in which the detection device according to claim 13 is installed one by one in each of the plurality of sections.

17. A detection device which is installed on a steel plate deck including a deck plate and a longitudinal rib fixed to the deck plate by a welded portion,
the longitudinal rib including splicing portion, and the longitudinal rib being divided into a plurality of sections in a bridge axial direction with the splicing portion as boundaries,
the detection device comprising:
- a plurality of sensors that detect an elastic wave, the sensors being divided to both sides of the splicing portion provided in the longitudinal rib in a bridge axial direction and being installed on the deck plate; and
- an output unit that outputs information obtained from the plurality of sensors to the outside.

18. A detection system that detects a position of a crack present in a steel plate deck including a deck plate and a longitudinal rib fixed to the deck plate by a welded portion, the detection system comprising:
- a first sensor and a second sensor that detect an elastic wave, the sensors being installed on the longitudinal rib within one of a plurality of sections of the longitudinal rib divided by one or more splicing portions provided in the longitudinal rib so as not to be divided to both sides of a first splicing portion included in the one or more splicing portions;
- a third sensor and a fourth sensor that detect an elastic wave, the sensors being divided to both sides of the first splicing portion in a bridge axial direction and being installed on the deck plate; and
- a locator that locates a generation source position of an elastic wave in a first inspection object region on the basis of outputs of the first sensor and the second sensor, and locates a generation source position of an elastic wave in a second inspection object region on the basis of outputs of the third sensor and the fourth sensor,
wherein the first inspection object region and the second inspection object region partially overlap each other.

19. A detection system that detects a position of a crack present in a structure including a first member for supporting a traveling surface on which a vehicle travels from below, a second member provided on an opposite side of the traveling surface with respect to the first member, and a welded portion provided along a boundary between the first member and the second member,
wherein a first inspection object region is set in the structure, and
the detection system comprises:
a first sensor and a second sensor which are disposed at positions away from both ends of the first inspection object region toward the outside by a predetermined distance or more in a bridge axial direction, and are installed on the first member or the second member; and
a locator that locates a generation source position of an elastic wave in the first inspection object region on the basis of outputs of the first sensor and the second sensor,
wherein a second inspection object region is set in the structure,
the detection system further comprises a third sensor and a fourth sensor which are disposed at positions away from both ends of the second inspection object region toward the outside by the predetermined distance or more in the bridge axial direction, and are installed on the first member or the second member,
the locator locates a generation source position of an elastic wave in the second inspection object region on the basis of outputs of the third sensor and the fourth sensor, and
the first inspection object region and the second inspection object region partially overlap each other.

* * * * *